US006251997B1

(12) United States Patent
Imai et al.

(10) Patent No.: US 6,251,997 B1
(45) Date of Patent: Jun. 26, 2001

(54) POLYPROPYLENE RESIN COMPOSITION AND INJECTION-MOLDED ARTICLE THEREOF

(75) Inventors: Tadashi Imai, Ichihara; Mikio Hashimoto, Sakai; Shigeru Harima, Takaishi, all of (JP)

(73) Assignee: Grand Polymer Co Ltd, Tokyo (JP)

( * ) Notice: Subject to any disclaimer, the term of this patent is extended or adjusted under 35 U.S.C. 154(b) by 0 days.

(21) Appl. No.: 09/497,228

(22) Filed: Feb. 3, 2000

(30) Foreign Application Priority Data

Feb. 5, 1999 (JP) .................................................. 11-028411

(51) Int. Cl.$^7$ .............................. C08L 23/00; C08L 23/10
(52) U.S. Cl. ........................... 525/191; 525/207; 525/210; 525/211; 525/221; 525/222; 525/232; 525/236; 525/240; 525/241
(58) Field of Search ..................................... 525/191, 207, 525/211, 221, 222, 232, 236, 240, 241

(56) References Cited

FOREIGN PATENT DOCUMENTS

| 0573862 | 12/1993 | (EP) . |
| 0919572 | 6/1999 | (EP) . |
| 59-172507 | 9/1984 | (JP) . |

OTHER PUBLICATIONS

Patent Abstracts of Japan, vol. 009, No. 028 (C–264), Feb. 6, 1985 & JP 59 172507 A (Mitsui Sekiyu Kagaku Kogyo KK), Sep. 29, 1984.

*Primary Examiner*—Nathan M. Nutter

(57) ABSTRACT

A polypropylene resin composition, which is light weighing, has very high values for the stiffness and heat resistance and is superior in the scratch-proof property with better moldability upon molding and which can be injection-molded into formed articles without occurrence of cracking, comprising 5–25% by weight of a higher molecular weight polypropylene (A) having an intrinsic viscosity [η], determined in decalin at 135° C., in the range from 6 to 11 dl/g and 95–75% by weight of a lower molecular weight polypropylene (B) having an intrinsic viscosity [η], determined in decalin at 135° C., in the range from 0.6 to 1.6 dl/g, wherein the said resin composition has the following charactristic features <<1>> and <<2>>, namely, <<1>> an isotactic pentad fraction (mmmm-fraction), determined by $^{13}$C-NMR, of at least 96.5% and <<2>> a molecular weight distribution value expressed by Mw/Mn (weight-average molecular weight/number-average molecular weight), determined by gel permeation chromatography (GPC), of at least 8.

42 Claims, No Drawings

POLYPROPYLENE RESIN COMPOSITION AND INJECTION-MOLDED ARTICLE THEREOF

FIELD OF THE INVENTION

The present invention relates to a polypropylene resin composition and to injection molded articles made of this resin composition.

DESCRIPTION OF RELATED ARTS

Polypropylene has widely been used in various fields including parts in automobile, parts for machines, parts for electric appliances, household commodities, kitchen utensils, packaging films and so on, wherein improvements in the performances thereof have been proposed by incorporation of additives therein which provide facilitation of requisite properties. For example, addition of an inorganic filler, such as talc, has been practised for improving stiffness and heat resistance. By incorporating a large amount of inorganic filler, such as talc and others, satisfactory stiffness and heat resistance can be attaied. However, a plastic resin containing talc exhibits disadvantages, such as higher specific gravity, tendency to easy occurrence of surface damages and scratches on articles molded therefrom and tendency to whitening of the damaged portion.

Therefore, polypropylene resin compositions have been in a progressive development, which exhibit stiffness and heat resistance comparable to those with addition of a large amount of talc and in which the specific weight is rendered lower and the scratch-proof property is improved.

In Japanese Patent Kokai Hei-6-93034 A (corresponding European Patent Application No. EP 573862 A2), a polypropylene product is described in which the processibility in molten state is improved. This polypropylene product exhibits, however, insufficient improvements in the mechanical properties, such as inferior flexural modulus and lower thermal deformation temperature.

In Japanese Patent Kokai Hei-4-202507 A, a process for producing a polypropylene resin in multiple polymerization staged in the presence of a catalyst having a specific solid titanium catalyst component is described, in which it is said that the resulting polypropylene resin is superior in the stiffness, heat resistance and so on. However, this process requires a prepolymerization of, such as, 3-methyl-1-butene, and is complicated. The polypropylene resin obtained by this process exhibits insufficient improvement in the stiffness.

In Japanese Patent Kokai Sho-59-172507 A, a process for producing a polypropylene resin superior in the stiffness, processibility and heat resistance is described, in which propylene is polymerized in two polymerization stages using a Ziegler catalyst. In this polypropylene resin, however, the improvements in the flexural modulus and in the stiffness are insufficient.

Japanese Patent Kokai Hei-4-370103 discloses a process for producing a polypropylene resin superior in the processibility and stiffness in a multi-stage polymerization using a specific catalyst. This polypropylene resin provides, however, insufficient improvement in the flexural modulus.

When alteration in the composition and in the molding conditions is incorporated in such polypropylene resin compositions as above for improving the flexural modulus and heat resistance, the flowability of resin upon injection molding may often be deteriorated with the result of frequent occurrence of rejects and, even if the resulting flexural modulus and heat resistance are satisfactory, the elongation at break is steeply decreased, whereby occurrence of cracks in the molded articles upon molding and fracture at the engagement junction upon assemblage of the molded products may sometimes become observed. Therefore, there have been demands for polypropylene resin compositions in the market, which cause no cracking even under severe molding conditions, have lower density and are superior in the stiffness and in the heat resistance.

SUMMARY OF THE INVENTION

The object of the present invention is to provide a polypropylene resin composition, which is light-weighing and has very high values of stiffness and heat resistance, superior scratch-proof or anti-damaging property and better flowability upon molding or shaping with superior processibility without occurence of cracking upon molding, as well as injection molded articles made of such polypropylene resin composition.

The present invention provides for the following polypropylene resin composition and injection-molded articles:

(1) A polypropylene resin composition comprising 5–25% by weight of a higher molecular weight polypropylene (A) having an intrinsic viscosity $[\eta]$, determined in decalin at 135° C., in the range from 6 to 11 dl/g and 95–75% by weight of a lower molecular weight polypropylene (B) having an intrinsic viscosity $[\eta]$, determined in decalin at 135° C., in the range from 0.6 to 1.6 dl/g, wherein the said resin composition has the following characteristic features <<1>> and <<2>>, namely, <<1>> an isotactic pentad fraction (mmmm-fraction), determined by $^{13}$C-NMR, of at least 96.5% and <<2>> a molecular weight distribution expressed by Mw/Mn (weight-average molecular weight/number-average molecular weight), determined by gel permeation chromatography (GPC), of at least 8.

(2) A polypropylene resin composition as defined in the above (1), wherein the resin composition has the following characteristic features <<3>> to <<6>>, namely, <<3>> a flexural modulus (ASTM D 790) of at least 2,700 MPa, <<4>> an elongation at break (ASTM D 638) of at least 7%, <<5>> a heat distortion temperature (ASTM D 648, under a load of 0.45 MPa) of at least 145° C., and <<6>> a flowability of at least 85 cm, determined using a flow length testing mold having a spiral flow path of a depth of 3 mm, a width of 10 mm and a length of 2,000 mm by performing an injection molding at a resin temperature of 210° C. and at a mold temperature of 40° C. to observe the flow length (the length of spiral flow).

(3) A polypropylene resin composition as defined in the above (1) or (2), wherein the resin composition is obtained by a continuous multistage polymerization.

(4) A polypropylene resin composition as defined in any one of the above (1) to (3), wherein it contains an inorganic filler (C).

(5) A polypropylene resin composition as defined in the above (4), wherein it has the following characteristic feature <<7>>, namely, <<7>> a specific gravity, determined by the water-displacement method (ASTM D 1505), of not higher than 0.930.

(6) A polypropylene resin composition as defined in the above (4) or (5), wherein it has the following characteristic features <<8>> and <<9>>, namely, <<8>> a pencil hardness {JIS K-5400, under a load of 9.8 N (1 kgf)} of F or harder and <<9>> a color-difference value ΔE* after scratch test of 8.0 or lower.

(7) A polypropylene resin composition as defined in any one of the above (1) to (6), wherein it contains a nucleating agent (D).

(8) A polypropylene resin composition as defined in any one of the above (1) to (7), wherein it is devoid of any cross-linked structure.

(9) Injection-molded articles obtainable by injection-molding a polypropylene resin composition as defined in any one of the above (1) to (8).

In the context of this specification, the above-mentioned isotactic pentad fraction (mmmm-fraction) corresponds to the proportion of the isotactic chains as pentad unit in the polypropylene molecular chains, which is determined using $^{13}$C-NMR and which is the proportion of the number of propylene monomeric units present in each center of the sequences of 5 monomeric propylene units bound each successively by meso-coupling. This can be determined in the practice as the proportion of the mmmm-peaks relative to the entire absorption peaks within the methyl carbon region in the $^{13}$C-NMR spectrum.

In the context of this specification, the values of Mw/Mn and Mz/Mw are determined by gel permeation chromatography (GPC).

The flexural modulus is determined under the condition according to ASTM D 790.

The elongation at break is determined under the condition according to ASTM D 638.

The heat distortion temperature is determined according to ASTM D 648 under a load of 0.45 MPa or 1.81 MPa.

The flowability is determined by performing an injection molding using a resin flow length testing mold having a spiral flow path of a depth of 3 mm, a width of 10 mm and a length of 2,000 mm at a resin temperature of 210° C. and at a mold temperature of 40° C. to observe the flow length (length of spiral flow). The greater this value is, the better the flowability is.

The specific gravity is determined by water-displacement method under the condition according to ASTM D 1505.

The pencil hardness is determined according to JIS K-5400 by visual judgement of a scratch formed on the surface to be tested in the direction of flow of molding by a pencil under a condition of 9.8 N (1 kgf) load.

The Izod impact strength is determined under a condition according to ASTM D 256 with an after-formed notch.

The color difference value ΔE* after scratch test is determined in such a manner that 21 scratch lines are formed on the molded article in the flow direction of molding at an interval of 1 mm each in a length of 6 cm using a wolfram alloy steel needle (Grade 2 of JIS G4404 SK) under a condition of a load of 0.98 N (100 gf) and the difference ΔE* of the color values is detected by a color-difference meter before and after the scratch lines are formed, using a white plate (X=77.55, Y=80.28 and Z=93.51) as the color standard. As the color-difference meter, there may be employed, for example, SM Color Computer of Suga Testing Machine K.K. The color difference value after scratch test is a parameter for the scratch-proof property of a surface. The smaller this value is, the superior is the scratch-proof property. Usually, the color difference value ΔE* after scratch test is greater as the content of inorganic filler, such as talc or the like, becomes greater.

The higher molecular weight polypropylene (A) contained in the polypropylene resin composition according to the present invention consists of a higher molecular weight polypropylene having an intrinsic viscosity [η], determined in decalin (decahydronaphthalene) at 135° C., of 6–11 dl/g, preferably 6.5–10.5 dl/g, more preferably 7–10 dl/g. If the intrinsic viscosity [η] of the higher molecular weight polypropylene (A) is lower than 6 dl/g, the flexural modulus and the heat resistance will become decreased and, if it exceeds a value of 11 dl/g, the flowability becomes markedly decreased, though the flexural modulus and the heat resistance are held high. The higher molecular weight polypropylene (A) may consist of either a sole polypropylene product or a mixture of two or more products. In the case of a mixture of two or more products, it is enough that the intrinsic viscosity [η] as the mixture is in the above defined range.

The content of the higher molecular weight polypropylene (A) in the polypropylene resin composition according to the present invention should be 5–25% by weight, preferably 7–20% by weight, more preferably 8–17% by weight. If the content of the higher molecular weight polypropylene (A) is lower than 5% by weight, deterioration in the flexural modulus and/or in the heat resistance will be caused and, if it exceeds over 25% by weight, a considerable reduction in the flowability will result, though the flexural modulus and the heat resistance are held high.

The intrinsic viscosity [η], as determined in decalin at 135° C., of the lower molecular weight polypropylene (B) in the polypropylene resin composition according to the present invention should be 0.6–1.6 dl/g, preferably 0.7–1.5 dl/g, more preferably 0.8–1.4 dl/g. If the intrinsic viscosity [η] of the lower molecular weight polypropylene (B) is lower than 0.6 dl/g, a considerable decrease in the elongation at break will result, with accompaniment of occurrence of cracking upon the molding, though a higher flowability will be attained. If it exceeds over 1.6 dl/g, a deterioration in the flexural modulus and/or in the heat resistance will be caused, in addition to a decrease in the flowability. The lower molecular weight polypropylene (B) may consist of either a sole polypropylene product or a mixture of two or more products. In the case of a mixture of two or more products, it is enough that the intrinsic viscosity [η] as the mixture is in the above defined range.

The intrinsic viscosity [η] of the lower molecular weight polypropylene (B) can be calculated according to the following equation (I):

$$\eta_B=(\eta_{AB}-\eta_A\times R_A)/R_B \qquad (I)$$

in which $\eta_A$ is the intrinsic viscosity [η] in dl/g of the higher molecular weight polypropylene (A), $\eta_B$ is the intrinsic viscosity [η] in dl/g of the lower molecular weight polypropylene (B), $\eta_{AB}$ is the intrinsic viscosity [η] in dl/g of the polypropylene resin composition, $R_A$ is the weight proportion of the higher molecular weight polypropylene (A) in the polypropylene resin composition and $R_B$ is the weight proportion of the lower molecular weight polypropylene (B) in the polypropylene resin composition.

The content of the lower molecular weight polypropylene (B) in the polypropylene resin composition according to the present invention should be 95–75% by weight, preferably 93–80% by weight, more preferably 92–83% by weight. If the content of the lower molecular weight polypropylene (B) is lower than 75% by weight, a considerable reduction in the flowability will result, though the flexural modulus and the heat resistance are held high. If the content of the lower molecular weight polypropylene (B) exceeds over 95% by weight, a reduction in the flexural modulus and/or heat resistance will be caused.

The polypropylene resin composition according to the present invention satisfies the following characteristic conditions <<1>> and <<2>>, namely, <<1>> an isotactic pentad fraction (mmmm-fraction), determined by $^{13}$C-NMR, of at least 96.5%, preferably at least 97%, more preferably at least 97.5% and <<2>> a molecular weight distribution expressed by Mw/Mn (weight-average molecular weight/number-average molecular weight), determined by gel permeation chromatography (GPC), of at least 8, preferably at least 9 and more preferably 10–30.

If the mmmm-fraction of the polypropylene resin composition is lower than 96.5%, a deterioration in the flexural modulus and/or in the heat resistance will be caused.

If the Mw/Mn value of the polypropylene resin composition is lower than 8, a deterioration in the flexural modulus and/or in the heat resistance will be caused. If the Mw/Mn value is higher than 30, a problem of pressure endurance may sometimes occur upon the production.

For the polypropylene resin composition according to the present invention, those which further satisfy the following characteristic conditions <<3>>, <<4>>, <<5>> and <<6>>, in addition to the above conditions <<1>> and <<2>>, are preferred, namely, <<3>> a flexural modulus (ASTM D 790) of at least 2,700 MPa, preferably at least 2,800 MPa, more preferably at least 2,900 MPa, <<4>> an elongation at break (ASTM D 638) of at least 7%, preferably at least 8%, more preferably at least 10%, <<5>> a heat distortion temperature (ASTM D 648, under a load of 0.45 MPa) of at least 145° C., preferably at least 147° C., more preferably at least 150° C., and <<6>> a flowability of at least 85 cm, preferably at least 90 cm, more preferably at least 95 cm, determined using a flow length testing mold having a spiral flow path of a depth of 3 mm, a width of 10 mm and a length of 2,000 mm by performing an injection molding at a resin temperature of 210° C. and at a mold temperature of 40° C. to observe the flow length (the length of spiral flow).

The polypropylene resin composition according to the present invention may contain, as described afterwards, an inorganic filler (C) by compounding it, wherein the resin composition after compounding the inorganic filler (C) may preferably further satisfy the following characteristic condition <<7>>, in addition to the characteristic conditions <<1>> and <<2>> or <<1>> to <<6>>.

<<7>> a specific gravity, determined by the water-displacement method (ASTM D 1505), of not higher than 0.930, preferably not higher than 0.927 and more preferably not higher than 0.925.

The polypropylene resin composition after having been blended with the inorganic filler (C) may favorably further satisfy the following characteristic conditions <<8>> and <<9>>, in addition to the chracteristic conditions <<1>> and <<2>>, <<1>> to <<6>> or <<1>> with <<2>> and <<7>> or, further, <<1>> to <<7>>.

<<8>> a pencil hardness {JIS K-5400, under a load of 9.8 N (1 kgf)} of F or harder, preferably H or harder, and <<9>> a color difference value ΔE* after scratch test of 8.0 or lower, preferably 7.0 or lower and more preferably 6.0 or lower.

The polypropylene resin composition according to the present invention may contain, as described afterwards, a nucleating agent (D) by compounding it, wherein the resin composition after being blended with the inorganic filler (C) and/or the nucleating agent (D) may preferably satisfy the characteristic conditions <<1>> and <<2>>; <<1>> to <<6>>; <<1>> with <<2>> and <<7>>; <<1>> to <<7>>; <<1>> with <<2>> and <<8>> with <<9>>; <<1>> to <<622>> with <<8>> and <<9>>; <<1>> and <<2>> with <<7>> to <<9>>; or <<1>> to <<9>>.

The melt flow rate (MFR) of the polypropylene resin composition according to the present invention as determined at 230° C. under a load of 2,16 kg according to ASTM D 1238 may favorably be 5–100 g/10 min., preferably 5–50 g/10 min., though there is no special restriction therefor. The polypropylene resin composition according to the present invention is superior in the flowability. When compared with known polypropylene resin of comparable MFR or with a polypropylene resin composition blended with a large amount of talc, the flowability of the polypropylene resin composition according to the present invention is better.

For the polypropylene resin composition according to the present invention, those having no cross-linked structure are preferred. Whether or not a polypropylene resin composition does contain cross-linked structure can be confirmed, for example, by the fact that the polypropylene resin composition dissolves completely in decalin at 135° C. A polypropylene resin composition having no content of cross-linked structure can be produced by the multistage polymerization process as described afterwards.

The polypropylene resin composition according to the present invention may favorably have a molecular weight distribution expressed by Mz/Mw (Z-average molecular weight/weight-average molecular weight), as determined by gel permeation chromatography (GPC), of 5 or higher, preferably 6 or higher, though there is no special limitation therefor.

The higher molecular weight polypropylene (A) and the lower molecular weight polypropylene (B) in the polypropylene resin composition according to the present invention may preferably be composed in general exclusively of the structural unit derived from propylene, though it may include other structural unit(s) derived from other comonomer(s) than propylene in a small proportion, for example, 10 mole % or lower, preferably 5 mole % or lower. Such other comonomer may include, for example, α-olefins other than propylene, such as ethylene, 1-butene, 1-pentene, 1-hexene, 4-methyl-1-pentene, 3-methyl-1-pentene, 1-heptene, 1-octene, 1-nonene, 1-decene and 1-dodecene; vinyl compounds, such as styrene, vinylcyclopentene, vinylcyclohexane and vinylnorbornane; vinyl esters, such as vinyl acetate and the like; unsaturated organic acids and derivatives thereof, such as maleic anhydride and the like; conjugated diene compounds; non-conjugated polyenes, such as dicyclopentadiene, 1,4-hexadiene, dicyclooctadiene, methylenenorbornene and 5-ethylidene-2-norbornene. Among them, preference is given to ethylene and α-olefins having 4–10 carbon atoms. They may be present as copolymers of two or more of them.

The polypropylene resin composition according to the present invention may contain, as a prepolymer, 0.1% by weight or less, preferably 0.05% by weight or less, of a homopolymer or copolymer of branched olefins, for example, 3-methyl-1-butene, 3,3-dimethyl-1-butene, 3-methyl-1-pentene, 3-ethyl-1-pentene, 4-methyl-1-pentene, 3-methyl-1-hexene, 4-methyl-1-hexene, 4,4-dimethyl-1-hexene, 4,4-dimethyl-1-pentene, 4-ethyl-1- hexene, 3-ethyl-1-hexene, 3,5,5-trimethyl-1-hexene, vinylcyclopentane, vinylcyclohexane, vinylcycloheptane, vinylnorbornane, allylnorbornane, styrene, dimethylstyrene, allylbenzene, allyltoluene, allylnaphthalene and vinylnaphthalene. Among them, special preference is given to 3-methyl-1-butene and the like. The prepolymer derived from such a branched olefin may serve as a nucleating agent for the polypropylene and can be used for increasing the isotactic pentad fraction and for improving the moldability.

The polypropylene resin composition according to the present invention may be constituted of only the higher molecular weight polypropylene (A) and the lower molecular weight polypropylene (B) or may contain other resin(s) than polypropylene in a small proportion. So long as a polymer product of propylene having the characteristic features defined above can be obtained in a single stage polymerization, this can be used as such for a polypropylene constituting the polypropylene resin composition according to the present invention. In general, however, it is favorable to produce the higher molecular weight polypropylene (A) and the lower molecular weight polypropylene (B) in a continuous or batch-wise multistage polymerization of at least 2-stages, especially preferably in a continuous multistage polymerization of at least two stages. It is permissible to melt-blend polypropylene products having different molecular weights produced separately, in order to thereby obtain a blended product.

The higher molecular weight polypropylene (A) and the lower molecular weight polypropylene (B) constituting the polypropylene resin composition according to the present invention may each also be a block-copolymer of propylene, such as propylene/ethylene block-copolymer, which is favorable due to a possible attainment of a superior impact resistance in addition to a superior stiffness. While there is no restriction as to the kind of such block-copolymer of propylene, special preference is given to a propylene/ethylene block-copolymer of which rubber part (ethylene/propylene copolymer) has an intrinsic viscosity [η] of 0.5–10 dl/g, a propylene/ethylene block-copolymer having an ethylene content of 40% by weight or less or the like.

As a preferred technique for producing the polypropylene resin composition according to the present invention, there may be exemplified, for example, a technique in which propylene is polymerized alone or together with other comonomer(s) in a multistage polymerization of two or more stages in the presence of a catalyst for producing highly stereospecific polypropylene.

For the catalyst for producing the highly stereospecific polypropylene mentioned above, there may be employed, for example, a catalyst composed of (a) a solid catalyst component based on titanium, which has contents of magnesium, titanium, halogen and an electron donating agent, (b) an organometallic compound and (c) an electron donor.

The solid catalyst component based on titanium (a) can be prepared by bringing a magnesium compound (a-1), a titanium compound (a-2) and an electron donor (a-3) into contact with each other.

As the magnesium compound (a-1), those which exhibit reducing function and those which do not exhibit any reducing function may be employed.

As the magnesium compound which exhibits a reducing function, there may be enumerated those having magnesium-carbon linkage or magnesium-hydrogen linkage. Concrete examples therefor include dimethylmagnesium, diethylmagnesium, dipropylmagnesium, dibutylmagnesium, diamylmagnesium, dihexylmagnesium, didecylmagnesium, ethylmagnesium chloride, propylmagnesium chloride, butylmagnesium chloride, hexylmagnesium chloride, amylmagnesium chloride, butylethoxymagnesium, ethylbutylmagnesium and butylmagnesium hydride.

As the magnesium compound which do not exhibit reducing function, there may be enumerated, for example, magnesium halides, such as magnesium chloride, magnesium bromide, magnesium iodide and magnesium fluoride; alkoxymagnesium halides, such as methoxymagnesium chloride, ethoxymagnesium chloride, isopropoxymagnesium chloride, butoxymagnesium chloride and octoxymagnesium chloride; aryloxymagnesium halides, such as phenoxymagnesium chloride and methylphenoxymagnesium chloride; alkoxymagnesiums, such as ethoxymagnesium, isopropoxymagnesium, butoxymagnesium, n-octoxymagnesium and 2-ethylhexoxymagnesium; aryloxymagnesiums, such as phenoxymagnesium and dimethylphenoxymagnesium; and carboxylic acid salts, such as magnesium laurate and magnesium stearate.

The magnesium compounds exhibiting no reducing function may be those derived from magnesium compounds exhibiting reducing function or those derived upon the preparation of a catalyst component. For deriving the magnesium compound exhibiting no reducing function from a magnesium compound exhibiting a reducing function, it is enough, for example, to bring the magnesium compound exhibiting a reducing function into contact with a polysiloxane compound, a halogen-containing silane compound, a halogen-containing aluminum compound, an ester, alcohol, halogen-containing compound or an active carbon-to-oxygen linkage-containing compound, such as ketone.

The magnesium compound (a-1) may be prepared during the preparation of the catalyst from magnesium metal. The magnesium compound (a-1) may be employed in a combination of two or more of them. The magnesium compound (a-1) may be present as a complex or a composite compound with other metal(s), such as aluminum, zinc, boron, beryllium, sodium and potassium, or may be a mixture with compound(s) of other metal(s).

While, according to the present invention, many magnesium compounds other than those given above can be employed, such other magnesium compounds may favorably be present in the titanium-based solid catalyst component (a) in a form of a halogen-containing magnesium compound. Therefore, on using a magnesium compound having no halogen content, the magnesium compound should preferably be subjected to a reaction under contact with a halogen-containing compound during preparation of a catalyst component.

Among the above-mentioned magnesium compounds, especially those having no reducing function are preferred, wherein particular preference is given to those having halogen content, of which magnesium chloride, alkoxymagnesium chlorides and aryloxymagnesium chlorides are particularly preferred.

The magnesium compound (a-1) according to the present invention may preferably be used in the preparation of a catalyst component in a liquid form, wherein the magnesium compound (a-1) of a solid form can be converted into liquid form using an electron donor.

As the liquefying agent, for example, alcohols, phenols, ketones, aldehydes, ethers, amines and pyridines, which will be described afterwards as the electron donor, may be used and, further, also esters of acidic metalates, such as tetraethoxytitanium, tetra-n-propoxytitanium, tetra-i- propoxytitanium, tetrabutoxytitanium, tetrahexoxytitanium, tetrabutoxyzirconium and tetraethoxyzirconium, may be used. Among them, special preference is given to alcohols and metalate esters.

The reaction for liquefying the solid magnesium compound (a-1) may, in general, be performed by contacting the solid magnesium compound with an above-mentioned liquefying agent with, if necessary, heating. This contact with the liquefying agent may be realized usually at a temperature of 0–200° C., preferably 20–180° C., more preferably 50–150° C.

The liquefying reaction may be performed in the co-existence of a solvent, such as a hydrocarbon, for example, an aliphatic hydrocarbon, such as pentane, hexane, heptane, octane, decane, dodecane, tetradecane or kerosine; an alicyclic hydrocarbon, such as cyclopentane, methylcyclopentane, cyclohexane, methylcyclohexane, cyclooctane or cyclohexene; a halogenated hydrocarbon, such as dichloroethane, dichloropropane, trichloroethylene or chlorobenzene; or an aromatic hydrocarbon, such as benzene, toluene or xylene.

In preparing the titanium-based solid catalyst component (a), it is preferable that, for example, a tetravalent titanium compound represented by the formula (1) given below is employed as the titanium compound (a-2).

$$Ti(OR)_g X_{4-g} \quad (1)$$

In the formula (1), R represents a hydrocarbon group, X denotes a halogen atom and g is in the range of $0 \leq g \leq 4$.

Concrete examples of the above titanium compound represented by the formula (1) include titanium tetrahalides, such as $TiCl_4$, $TiBr_4$ and $TiI_4$; alkoxytitanium trihalides, such as $Ti(OCH_3)Cl_3$, $Ti(OC_2H_5)Cl_3$, $Ti(O-n-C_4H_9)Cl_3$, $Ti(OC_2H_5)Br_3$, and $Ti(O-iso-C_4H_9)Br_3$; dialkoxytitanium dihalides, such as $Ti(OCH_3)_2Cl_2$, $Ti(OC_2H_5)_2Cl_2$, $Ti(O-n-C_4H_9)_2Cl_2$ and $Ti(OC_2H_5)_2Br_2$; trialkoxytitanium monohalides, such as $Ti(OCH_3)_3Cl$, $Ti(OC_2H_5)_3Cl$, $Ti(O-n-C_4H_9)_3Cl$ and $Ti(OC_2H_5)_3Br$; and tetraalkoxytitanium, such as $Ti(OCH_3)_4$, $Ti(OC_2H_5)_4$, $Ti(O-n-C_4H_9)_4$, $Ti(O-iso-C_4H_9)_4$ and $Ti(O-2-ethylhexyl)_4$. Among them, preference is given to halogen-containing titanium compounds, especially, titanium tetrahalides, in particular, titanium tetrachloride.

The titanium compound (a-2) may be employed in combination of two or more of the compounds. The titanium compound (a-2) can be used under dilution with a solvent, such as a hydrocarbon or a halogenated hydrocarbon.

For the electron donor (a-3) to be incorporated in the preparation of the titanium-based solid catalyst component (a), there may be exemplified alcohols, phenols, ketones, aldehydes, esters of organic or inorganic acids, organic acid halides, ethers, acid amides, acid anhydrides, ammonia, amines, nitriles, isocyanates, nitrogen-containing cyclic compounds and oxygen-containing cyclic compounds. More concretely, they include alcohols having 1–18 carbon atoms, such as methanol, ethanol, propanol, pentanol, hexanol, octanol, 2-ethyl-hexanol, dodecanol, octadecyl alcohol, oleyl alcohol, benzyl alcohol, phenylethyl alcohol, cumyl alcohol, isopropyl alcohol and isopropylbenzyl alcohol; phenols having 6–20 carbon atoms which may contain lower alkyl group(s), such as phenol, cresol, xylenol, ethylphenol, propylphenol, nonylphenol, cumylphenol and naphthol; ketones having 3–15 carbon atoms, such as acetone, methyl ethyl ketone, methyl isobutyl ketone, acetophenone, benzophenone, acetylacetone and benzoquinone; and aldehydes having 2–15 carbon atoms, such as acetaldehyde, propionaldehyde, octyl aldehyde, benzaldehyde, tolualdehyde and naphthaldehyde.

As further examples, there may be enumerated esters of organic acids having 2–30 carbon atoms, such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, n-butyl maleate, diisobutyl methylmalonate, di-n-hexyl cyclohexenecarboxylate, diethyl ester of Nadic acid, diisopropyl tetrahydrophthalate, diethyl phthalate, diisobutyl phthalate, di-n-butyl phthalate, di-2-ethylhexyl phthalate, γ-butyrolactone, δ-valerolactone, cumarin, phthalide and ethyl carbonate; acid halides having 2–15 carbon atoms, such as acetyl chloride, benzoyl chloride, toluyl chloride and anisyl chloride; ethers having 2–20 carbon atoms, such as methyl ether, ethyl ether, isopropyl ether, butyl ether, amyl ether, anisole and diphenyl ether-epoxy-p-menthane; acid amides, such as acetic amide, benzoic acid amide and toluic acid amide; acid anhydrides, such as acetic anhydride, phthalic anhydride and benzoic anhydride; amines, such as methylamine, ethylamine, dimethylamine, diethylamine, ethylenediamine, tetramethylenediamine, hexamethylenediamine, tributylamine and tribenzylamine; nitriles, such as acetonitrile, benzonitrile and tolunitrile; heterocyclic nitrogen-containing compounds, for example, pyrroles, such as pyrrole, methylpyrrole and dimethylpyrrole, pyridines, such as pyrroline, pyrrolidine, indole, pyridine, methylpyridine, ethylpyridine, propylpyridine, dimethylpyridine, ethylmethylpyridine, trimethylpyridine, phenylpyridine, benzylpyridine and chloropyridine, piperidines, quinolines and isoquinolines; and heterocyclic oxygen-containing compounds, such as tetrahydrofuran, 1,4-cineole, 1,8-cineole, pinolfuran, methylfuran, dimethylfuran, diphenylfuran, benzofuran, cumaran, phthalan, tetrahydropyran, pyran and dihydropyran.

As the organic acid esters to be used as the electron donor (a-3), esters of polyvalent carboxylic acids having molecular skeleton represented by the formula (2) given below are especially preferred.

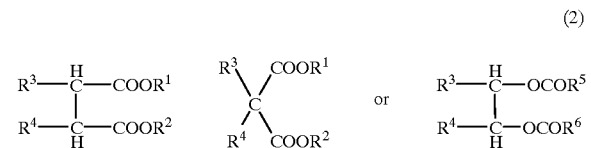

(2)

In the formula (2), $R^1$ denotes a substituted or unsubstituted hydrocarbon group, $R^2$, $R^5$ and $R^6$ denote each hydrogen atom or a substituted or unsubstituted hydrocarbon group, $R^3$ and $R^4$ represent each hydrogen atom or a substituted or unsubstituted hydrocarbon group with at least one of them being preferably a substituted or unsubstituted hydrocarbon group. $R^3$ and $R^4$ may also build up together a cyclic structure by being combined with each other. When the hydrocarbon groups $R^1$ to $R^6$ are substituted ones, the substituent groups may contain one or more heteroatoms, such as N, O or S, and may contain atom group(s) of, for example, C—O—C, COOR, COOH, OH, $SO_3H$, C—N—C and $NH_2$.

As the esters of polyvalent carboxylic acid, there may be enumerated concretely, for example, esters of aliphatic polycarboxylic acids, such as diethyl succinate, dibutyl succinate, diethyl methyl succinate, diisobutyl α-methyl glutarate, diethyl methyl malonate, diethyl ethyl malonate, diethyl isopropyl malonate, diethyl butyl malonate, diethyl phenyl malonate, diethyl diethyl malonate, diethyl dibutyl malonate, monooctyl maleate, dioctyl maleate, dibutyl maleate, dibutyl butyl maleate, diethyl butyl maleate, diisopropyl β-methyl glutarate, diallyl ethyl succinate, di-2-ethyl-hexyl fumarate, diethyl itaconate and dioctyl citraconate; esters of alicyclic polycarboxylic acids, such as diethyl 1,2-cyclohexane carboxylate, diisobutyl 1,2-cyclohexane carboxylate, diethyl tetrahydro phthalate and diethyl ester of Nadic acid; esters of aromatic polycarboxylic acids, such as monoethyl phthalate, dimethyl phthalate, methyl ethyl phthalate, monoisobutyl phthalate, diethyl phthalate, ethyl isobutyl phthalate, di-n-propyl phthalate, diisopropyl phthalate, di-n-butyl phthalate, diisobutyl phthalate, di-n-heptyl phthalate, di-2-ethyl-hexyl phthalate, di-n-octyl phthalate, dineopentyl phthalate, didecyl phthalate, benzyl butyl phthalate, diphenyl phthalate, diethyl naphthalene dicarboxylate, dibutyl naphthalene dicarboxylate, triethyl trimellitate and dibutyl trimellitate; and esters of heterocyclic polycarboxylic acids, such as 3,4-furan-dicarboxylates.

For the esters of polyvalent carboxylic acids, there may further be enumerated, for example, esters of long-chain dicarboxylic acids, such as diethyl adipate, diisobutyl adipate, diisopropyl sebacate, di-n-butyl sebacate, di-n-octyl sebacate and di-2-ethyl-hexyl sebacate.

As the electron donor (a-3), there may further be employed the organosilicic compounds and polyether compounds to be used as the electron donor component (c) described afterwards, as well as water and anionic, cationic and non-ionic surfactants.

As the electron donor (a-3), preference is given to esters of carboxylic acids, especially, to esters of polycarboxylic acids, in particular, esters of phthalic acid. The electron donor (a-3) may be employed also in combination of two or more of them.

In contacting the magnesium compound (a-1), the titanium compound (a-2) and the electron donor (a-3) with each other, it is permissible that other reaction reagent, such as silicium, phosphorus or aluminum, may be caused to be present simultaneously and it is also permissible to incorporate a solid catalyst carrier for preparing a carrier-supported solid titanium catalyst component (a).

For such carriers, there may be exemplified $Al_2O_3$, $SiO_2$, $B_2O_3$, MgO, CaO, $TiO_2$, ZnO, $SnO_2$, BaO and ThO as well as resins, such as styrene/divinylbenzene copolymer and the like. Among them, $Al_2O_3$, $SiO_2$ and styrene/divinylbenzene copolymer are employed preferably.

The titanium-based solid catalyst component (a) may be prepared by any technique including known one. Examples of such preparation technique are given below in a brief description:

(1) A technique in which a solution of the magnesium compound (a-1) in a hydrocarbon solvent containing the electron donor (the liquefying agent) (a-3) is brought into contact with the organometallic compound to cause a reaction to precipitate solid matter which is then, or in the course of precipitation, brought into contact with the titanium compound (a-2) to cause reaction.

(2) A technique in which a complex composed of the magnesium compound (a-1) and the electron donor (a-3) is brought into contact with the organometallic compound to cause reaction and, then, the titanium compound (a-2) is caused to contact and react therewith.

(3) A technique in which the contacted product from the contact of an inorganic carrier with an organomagnesium compound (a-1) is brought into contact with the titanium compound (a-2) and with the electron donor (a-3) to cause reaction therebetween. Here, it is permissible to bring the product of contact of the carrier with the magnesium compound into contact with a halogen-containing compound and/or an organometallic compound preliminarily.

(4) A technique, wherein a solid carrier, which is obtained from a mixture containing a solution of the magnesium compound (a-1), the electron donor (a-3) and the carrier in a liquid medium of the liquefying agent and, optionally, a hydrocarbon solvent and on which the magnesium compound (a-1) is supported, is contacted with the titanium compound (a-2).

(5) A technique in which a solution containing the magnesium compound (a-1), the titanium compound (a-2), the electron donor (a-3) and, optionally, a hydrocarbon solvent is brought into contact with a solid carrier.

(6) A technique in which an organomagnesium compound (a-1) in liquid form and a halogen-containing titanium compound (a-2) are brought into contact with each other. In this case, the electron donor (a-3) is used at least once.

(7) A technique in which an organomagnesium compound (a-1) in liquid form and a halogen-containing titanium compound (a-2) are brought into contact with each other, whereupon the resulting product is caused to contact with the titanium compound (a-2). In this case, the electron donor (a-3) is used at least once.

(8) A technique in which an alkoxyl group-containing magnesium compound (a-1) is brought into contact with a halogen-containing titanium compound (a-2). In this case, the electron donor (a-3) is used at least once.

(9) A technique in which a complex composed of an alkoxyl group-containing magnesium compound (a-1) and of the electron donor (a-3) is brought into contact with the titanium compound (a-2).

(10) A technique in which a complex composed of an alkoxyl group-containing magnesium compound (a-1) and the electron donor (a-3) is brought into contact with an organometallic compound, whereupon the resulting product is brought into contact with the titanium compound (a-2).

(11) A technique in which the magnesium compound (a-1), the electron donor (a-3) and the titanium compound (a-2) are brought into contact with each other in a voluntary order to cause reactions therebetween. It is permissible to incorporate a pretreatment of each reaction component before these reactions using a reaction assistant, such as an electron donor (a-3), an organometallic compound, a halogen-containing silicium compound or the like.

(12) A technique in which a liquid magnesium compound (a-1) exhibiting no reducing function is caused to react with a liquid titanium compound (a-2) in the presence of the electron donor (a-3) to deposit a solid magnesium/titanium composite product.

(13) A technique in which the reaction product obtained in the above (12) is further reacted with the titanium compound (a-2).

(14) A technique in which the reaction product obtained in the above (11) or (12) is further reacted with the electron donor (a-3) and with the titanium compound (a-2).

(15) A technique in which a solid mixture obtained by crushing the magnesium compound (a-1), the titanium compound (a-2) and the electron donor (a-3) is treated with either an elementary halogen, a halogen compound or an aromatic hydrocarbon. In this case, it is permissible to incorporate a process step of crushing either the magnesium compound (a-1) solely, a complex composed of the magnesium compound (a-1) and of the electron donor (a-3) or the magnesium compound (a-1) and the titanium compound (a-2). It is also permissible to subject the crushed product to a pretreatment with a reaction assistant, followed by an after-treatment with, such as, an elementary halogen. As the reaction assistant, for example, an organometallic compound or a halogen-containing silicium compound, may be employed.

(16) A technique in which the magnesium compound (a-1) is crushed and the resulting crushed product is brought into contact with the titanium compound (a-2). Upon crushing and/or contacting the magnesium compound (a-1), an electron donor (a-3) may, if necessary, be employed together with a reaction assistant.

(17) A technique in which the product obtained in either of the above (11)–(16) is treated with an elementary halogen or a halogen compound or with an aromatic hydrocarbon.

(18) A technique in which a reaction product resulting after the metal oxide, the organomagnesium compound (a-1) and the halogen-containing compound are contacted with each other is caused to contact with the electron donor (a-3) and with, preferably, the titanium compound (a-2).

(19) A technique in which a magnesium compound (a-1), such as a magnesium salt of an organic acid, an alkoxy-magnesium or an aryloxymagnesium, is brought into contact with the titanium compound (a-2), with the electron donor (a-3) and, if necessary, further with a halogen-containing hydrocarbon.

(20) A technique in which a solution of the magnesium compound (a-1) and an alkoxytitanium in a hydrocarbon solvent is brought into contact with the electron donor (a-3) and, if necessary, further with the titanium compound (a-2). In this case, it is favorable that a halogen-containing compound, such as a halogen-containing silicium compound, is caused to co-exist.

(21) A technique in which a liquid magnesium compound (a-1) exhibiting no reducing function is caused to react with an organometallic compound to cause a composite solid product of magnesium/metal (aluminum) to deposit out and, then, the product is reacted with the electron donor (a-3) and with the titanium compound (a-2).

While the amount of each component to be contacted on preparing the solid titanium catalyst component (a) may be different for each specific technique for the preparation and cannot be defined in a common rule, it is favorable to use, for example, the electron donor (a-3) in an amount in the range of 0.01–10 moles, preferably 0.1–5 moles, and the titanium compound (a-2) in an amount in the range of 0.01–1,000 moles, preferably 0.1–200 moles, respectively, per one mole of the magnesium compound (a-1).

The solid titanium catalyst component (a) prepared in the above manner contains magnesium, titanium, a halogen and an electron donor. In this solid titanium catalyst component (a), it is favorable that the atomic ratio of halogen/titanium amounts to about 2–200, preferably 4–100, the mole ratio of the electron donor/titanium amounts to about 0.01–100, preferably 0.02–10 and the atomic ratio of magnesium/titanium amounts to about 1–100, preferably 2–50.

As the organometallic compound (b) to be used together with the solid titanium catalyst component (a), those which contain a metal selected among the Group I to Group III of the periodic table are preferred. Concretely, there may be exemplified organoaluminum compounds, complex alkyl compounds with Group I metal and aluminum, organometallic compounds of Group II metals and so on, represented by the formulae given below:

An organoaluminum compound (b-1) represented by the formula

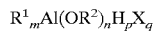
$R^1_m Al(OR^2)_n H_p X_q$

In which $R^1$ and $R^2$ represent each a hydrocarbon group having usually 1–15 carbon atoms, preferably 1–4 carbon atoms, which may be identical with or different from each other, X denotes a halogen atom, m is in the range $0<m\leq 3$, n is in the range $0\leq n<3$, p is in the range $0\leq p<3$ and q is in the range $0\leq q<3$, wherein $m+n+p+q=3$.

An alkylated complex of a Group I metal and aluminum (b-2) represented by the formula $M^1 AlR^1_4$ In the formula, $M^1$ is Li, Na or K and $R^1$ has the same meaning as above.

A dialkylated compound of Group II or Group III metal (b-3) represented by the formula $R^1 R^2 M^2$ In the formula, $R^1$ and $R^2$ have the same meanings as above and $M^2$ is Mg, Zn or Cd.

As the organoaluminum compound (b-1), there may be enumerated, for example, those which are represented by the formula

$R^1_m Al(OR^2)_{3-m}$, in which $R^1$ and $R^2$ have the same meanings as above and m is preferably of $1.5 \leq m \leq 3$; those which are represented by the formula $R^1_m AlX_{(3-m)}$, in which $R^1$ has the same meaning as above, X stands for a halogen and m is preferably of $0<m<3$; those which are represented by the formula

$R^1_m AlH_{(3-m)}$, in which $R^1$ has the same meaning as above and m is preferably of $2\leq m<3$; and those which are represented by the formula $R^1_m Al(OR^2)_n X_q$, in which $R^1$ and $R^2$ have the same meanings as above, X stands for a halogen, m is in the range $0<m\leq 3$, n is in the range $0\leq n<3$ and q is in the range $0\leq q<3$, wherein $m+n+q=3$.

More concretely, the organoaluminum compound (b-1) may be exemplified by trialkylaluminums, such as triethylaluminum and tributylaluminum; trialkenylaluminums, such as triisoprenylaluminum and so on; dialkylaluminum alkoxides, such as diethylaluminum ethoxide and dibutylaluminum butoxide; alkylaluminum sesquialkoxides, such as ethylaluminum sesquiethoxide and butylaluminum sesquibutoxide; partially alkoxylated alkylaluminums, such as those which have an average composition represented by a formula of, for example, $R^1_{2.5}Al(OR^2)_{0.5}$; dialkylaluminum halides, such as diethylaluminum chloride, dibutylaluminum chloride and diethylaluminum bromide; alkylaluminum sesquihalides, such as ethylaluminum sesquichloride, butylaluminum sesquichloride and ethylaluminum sesquibromide; partly halogenated alkylaluminums, such as ethylaluminum dichloride, propylaluminum dichloride and butylaluminum dibromide; dialkylaluminum hydrides, such as diethylaluminum hydride and dibutylaluminum hydride; partially hydrogenated alkylaluminums, for example, alkylaluminum dihydrides, such as ethylaluminum dihydride and propylaluminum dihydride; and partially alkoxylated and halogenated alkylaluminums, such as ethylaluminum ethoxy chloride, butylaluminum butoxy chloride and ethylaluminum ethoxy bromide.

As compounds resembling the organoaluminum compound (b-1), there may be enumerated, organoaluminum compounds in which two or more aluminum atoms are bound together via an oxygen atom or nitrogen atom, such as for example, $(C_2H_5)_2AlOAl(C_2H_5)_2$, $(C_4H_9)_2AlOAl(C_4H_9)_2$ and $(C_2H_5)_2AlN(C_2H_5)Al(C_2H_5)_2$, as well as aluminoxanes, such as methylaluminoxane and so on.

As the alkylated complex (b-2), there may be enumerated, for example, $LiAl(C_2H_5)_4$ and $LiAl(C_7H_5)_4$.

As the organometallic compound (b), there may be used favorably organoaluminum compounds (b-1), in particular, trialkylaluminums.

The organometallic compound (b) may be incorporated in combination of two or more.

Concrete examples of the electron donor (c) to be used together with the titanium-based solid catalyst component (a) and the organometallic compound (b) include organosilicic compounds (c-1) represented by the formula (3) given below and compounds (c-2) having two or more ether linkages which are present under intermediation by a plurality of atoms.

$$R^1_n Si\ (OR^2)_{(4-n)} \qquad (3)$$

In the formula (3), n is an integer of 1, 2 or 3, $R^1$ is a secondary or tertiary hydrocarbyl group when n is 1 and at least one $R^1$ may stand for a secondary or tertiary hydrocarbyl group when n is 2 or 3, the groups $R^1$ being identical with or different from each other, $R^2$ denotes a hydrocarbyl group having 1–4 carbon atoms, wherein the groups $R^2$ may be identical with or different from each other when (4–n) equals to 2 or 3.

As the secondary or tertiary hydrocarbyl group in the organosilicic compounds (c-1) represented by the formula (3), there may be enumerated cyclopentyl, cyclopentenyl, cyclopentadienyl, substituent-containing ones of them and hydrocarbyl groups having secondary or tertiary carbon atom adjoining the silicon atom. More concretely, there may be enumerated as the substituent-containing cyclopentyl group those alkyl-substituted ones, for example, 2-methylcyclopentyl, 3-methylcyclopentyl, 2-ethylcyclopentyl, 2-n-butylcyclopentyl, 2,3-dimethylcyclopentyl, 2,4-dimethylcyclopentyl, 2,5-dimethylcyclopentyl, 2,3-diethylcyclopentyl, 2,3,4-trimethylcyclopentyl, 2,3,5-trimethylcyclopentyl, 2,3,4-triethylcyclopentyl, tetramethylcyclopentyl and tetraethylcyclopentyl.

As substituted cyclopentenyl groups, there may be enumerated those alkyl-substituted ones, for example, 2-methylcyclopentenyl, 3-methylcyclopentenyl, 2-ethylcyclopentenyl, 2-n-butylcyclopentenyl, 2,3-dimethylcyclopentenyl, 2,4-dimethylcyclopentenyl, 2,5-dimethylcyclopentenyl, 2,3,4-trimethylcyclopentenyl, 2,3,5-tri-methylcyclopentenyl, 2,3,4-triethylcyclopentenyl, tetramethylcyclopentenyl and tetraethylcyclopentenyl.

As substituted cyclopentadienyl groups, there may be enumerated those alkyl-substituted ones, for example, 2-methylcyclopentadienyl, 3-methylcyclopentadienyl, 2-ethylcyclopentadienyl, 2-n-butylcyclopentadienyl, 2,3-dimethylcyclopentadienyl, 2,4-dimethylcyclopentadienyl, 2,5-dimethylcyclopentadienyl, 2,3-diethylcyclopentadienyl, 2,3,4-trimethylcyclopentadienyl, 2,3,5-trimethylcyclopentadienyl, 2,3,4-triethylcyclopentadienyl, 2,3,4,5-tetramethylcyclopentadienyl, 2,3,4,5-tetraethylcyclopentadienyl, 1,2,3,4,5-pentamethylcyclopentadienyl and 1,2,3,4,5-pentaethylcyclopentadienyl.

As the hydrocarbyl groups having secondary carbon atom adjoining the silicon atom, there may be exemplified i-propyl, s-butyl, s-amyl and α-methyl-benzyl. As the hydrocarbyl groups having tertiary carbon atom adjoining the silicon atom, there may be exemplified t-butyl, t-amyl, α,α'-dimethylbenzyl and adamantyl.

The organosilicic compounds (c-1) represented by the formula (3) in which n is 1 include trialkoxysilanes, for example, cyclopentyltrimethoxysilane, 2-methylcyclopentyltrimethoxysilane, 2,3-dimethylcyclopentyltrimethoxysilane, cyclopentyltriethoxysilane, isobutyltriethoxysilane, t-butyltriethoxysilane, cyclohexyltrimethoxysilane, cyclohexyltriethoxysilane, 2-norbornanetrimethoxysilane and 2-norbornanetriethoxysilane.

As the organosilicic compound (c-1) represented by the formula (3) in which n is 2, there may be enumerated, for example, dialkoxysilanes, such as dicyclopentyldimethoxysilane, dicyclopentyldiethoxysilane, t-butylmethyldimethoxysilane, t-butylmethyldiethoxysilane, t-amylmethyldiethoxysilane, dicyclohexyldimethoxysilane, cyclohexylmethyldimethoxysilane, cyclohexylmethyldiethoxysilane and 2-norbornanemethyldimethoxysilane, as well as dimethoxy compounds represented by the following formula (4) may be enumerated

(4)

In the above formula (4), $R^1$ and $R^2$ represent each independently of each other cyclopentyl, a substituted cyclopentyl, cyclopentenyl, a substituted cyclopentenyl, cyclopentadienyl, a substituted cyclopentadienyl or a hydrocarbyl having secondary or tertiary carbon atom adjoining the silicon atom.

As the dimethoxy compounds represented by the formula (4), there may be exemplified:
dicyclopentyldimethoxysilane,
dicyclopentenyldimethoxysilane,
dicyclopentadienyldimethoxysilane,
di-t-butyldimethoxysilane,
di(2-methylcyclopentyl)dimethoxysilane,
di(3-methylcyclopentyl)dimethoxysilane,
di(2-ethylcyclopentyl)dimethoxysilane,
di(2,3-dimethylcyclopentyl)dimethoxysilane,
di(2,4-dimethylcyclopentyl)dimethoxysilane,
di(2,5-dimethylcyclopentyl)dimethoxysilane,
di(2,3-diethylcyclopentyl)dimethoxysilane,
di(2,3,4-trimethylcyclopentyl)dimethoxysilane,
di(2,3,5-trimethylcyclopentyl)dimethoxysilane,
di(2,3,4-triethylcyclopentyl)dimethoxysilane,
di(tetramethylcyclopentyl)dimethoxysilane,
di(tetraethylcyclopentyl)dimethoxysilane,
di(2-methylcyclopentenyl)dimethoxysilane,
di(3-methylcyclopentenyl)dimethoxysilane, di(2-methylcyclopentenyl)dimethoxysilane,
di(2-n-butylcyclopentenyl)dimethoxysilane,
di(2,3-dimethylcyclopentenyl)dimethoxysilane,
di(2,4-dimethylcyclopentenyl)dimethoxysilane,
di(2,5-dimethylcyclopentenyl)dimethoxysilane,
di(2,3,4-trimethylcyclopentenyl)dimethoxysilane,
di(2,3,5-trimethylcyclopentenyl)dimethoxysilane,
di(2,3,4-trimethylcyclopentenyl)dimethoxysilane,
di(tetramethylcyclopentenyl)dimethoxysilane,
di(tetraethylcyclopentenyl)dimethoxysilane,
di(2-methylcyclopentadienyl)dimethoxysilane,
di(3-methylcyclopentadienyl)dimethoxysilane,
di(2-ethylcyclopentadienyl)dimethoxysilane,
di(2-n-butylcyclopentenyl)dimethoxysilane,
di(2,3-dimethylcyclopentadienyl)dimethoxysilane,
di(2,4-dimethylcyclopentadienyl)dimethoxysilane,
di(2,5-dimethylcyclopentadienyl)dimethoxysilane,
di(2,3-diethylcyclopentadienyl)dimethoxysilane,
di(2,3,4-trimethylcyclopentadienyl)dimethoxysilane,
di(2,3,5-trimethylcyclopentadienyl)dimethoxysilane,
di(2,3,4-triethylcyclopentadienyl)dimethoxysilane,
di(2,3,4,5-tetramethylcyclopentadienyl)dimethoxysilane,
di(2,3,4,5-tetraethylcyclopentadienyl)dimethoxysilane,
di(1,2,3,4,5-pentamethylcyclopentadienyl)dimethoxysilane,
di(1,2,3,4,5-pentaethylcyclopentadienyl)dimethoxysilane,
di-t-amyldimethoxysilane,
di(α,α'-dimethylbenzyl)dimethoxysilane,
di(adamantyl)dimethoxysilane,
adamantyl-t-butyldimethoxysilane,
cyclopentyl-t-butyldimethoxysilane,
diisopropyldimethoxysilane,
di-s-butyldimethoxysilane,
di-s-amyldimethoxysilane and
isopropyl-s-butyldimethoxysilane.

As the organosilicic compound (c-1) of the formula (3) in which n is 3, there may be enumerated, for example, monoalkoxysilanes, such as tricyclopentylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane and cyclopentyldimethylethoxysilane.

For the electron donor (c), dimethoxysilanes, especially the dimethoxysilanes represented by the formula (4) are preferred and, concretely, preference is given to dicyclopentyldimethoxysilane, di-t-butyldimethoxysilane, di(2-methylcyclopentyl)dimethoxysilane, di(3-methylcyclopentyl)dimethoxysilane and di-t-amyldimethoxysilane.

The organosilicic compound (c-1) may be used in combination of two or more.

In the compound (c-2) having two or more ether linkages bound under intermediation by a plurality of atoms (referred to hereinafter sometimes as polyether compound) to be used as the electron donor (c), the atoms present between the ether linkages may be of one or more elements selected from the group consisting of carbon, silicon, oxygen, sulfer, phosphorus and boron, wherein the number of atoms are at least two. Among them, preference is given to those in which a relatively bulky substituent, namely, one having at least two, preferably at least three carbon atoms and a linear, branched or cyclic structure, in particular a branched or cyclic structure, is bound to the atom present between the ether linkages. Further, compounds having a plurality of, preferably 3–20, more preferably 3–10, especially 3–7, carbon atoms between two or more ether linkages are preferred.

For such polyether compound (c-2), for example, compounds represented by the formula (5) given below may be exemplified:

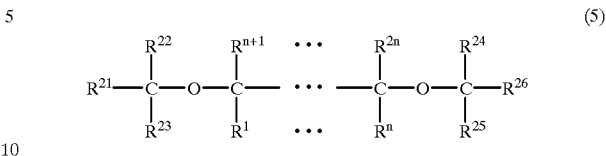

(5)

In the above formula (5), n is an integer of $2 \leq n \leq 10$, $R^1$ to $R^{26}$ denote each a substituent containing at least one element selected from the group consisting of carbon, hydrogen, oxygen, halogen, nitrogen, sulfur, phosphorus, boron and silicon, wherein voluntary substituents among $R^1$–$R^{26}$, preferably among $R^1$–$R^{2n}$ may form together a ring other than benzene ring and may contain atoms other than carbon.

Concrete examples of the polyether compound (c-2) represented by the above formula (5) include:
2-(2-ethylhexyl)-1,3-dimethoxypropane,
2-isopropyl-1,3-dimethoxypropane,
2-butyl-1,3-dimethoxypropane,
2-s-butyl-1,3-dimethoxypropane,
2-cyclohexyl-1,3-dimethoxypropane,
2-phenyl-1,3-dimethoxypropane,
2-cumyl-1,3-dimethoxypropane,
2-(2-phenylethyl)-1,3-dimethoxypropane,
2-(2-cyclohexylethyl)-1,3-dimethoxypropane,
2-(p-chlorophenyl)-1,3-dimethoxypropane,
2-(diphenylmethyl)-1,3-dimethoxypropane,
2-(1-naphthyl)-1,3-dimethoxypropane,
2-(2-fluorophenyl)-1,3-dimethoxypropane,
2-(1-decahydronaphthyl)-1,3-dimethoxypropane,
2-(p-t-butylphenyl)-1,3-dimethoxypropane,
2,2-dicyclohexyl-1,3-dimethoxypropane,
2,2-dicyclopentyl-1,3-dimethoxypropane,
2,2-diethyl-1,3-dimethoxypropane,
2,2-dipropyl-1,3-dimethoxypropane,
2,2-diisopropyl-1,3-dimethoxypropane,
2,2-dibutyl-1,3-dimethoxypropane,
2-methyl-2-propyl-1,3-dimethoxypropane,
2-methyl-2-benzyl-1,3-dimethoxypropane,
2-methyl-2-ethyl-1,3-dimethoxypropane,
2-methyl-2-isopropyl-1,3-dimethoxypropane,
2-methyl-2-phenyl-1,3-dimethoxypropane,
2-methyl-2-cyclohexyl-1,3-dimethoxypropane,
2,2-bis(p-chlorophenyl)-1,3-dimethoxypropane,
2,2-bis(2-cyclohexylethyl)-1,3-dimethoxypropane,
2-methyl-2-isobutyl-1,3-dimethoxypropane,
2-methyl-2-(2-ethylhexyl)-1,3-dimethoxypropane,
2,2-diisobutyl-1,3-dimethoxypropane,
2,2-diphenyl-1,3-dimethoxypropane,
2,2-dibenzyl-1,3-dimethoxypropane,
2,2-bis(cyclohexylmethyl)-1,3-dimethoxypropane,
2,2-diisobutyl-1,3-diethoxypropane,
2,2-diisobutyl-1,3-dibutoxypropane,
2-isobutyl-2-isopropyl-1,3-dimethoxypropane,
2-(1-methylbutyl)-2-isopropyl-1,3-dimethoxypropane,
2-(1-methylbutyl)-2-s-butyl-1,3-dimethoxypropane,
2,2-di-s-butyl-1,3-dimethoxypropane,
2,2-di-t-butyl-1,3-dimethoxypropane,
2,2-dineopentyl-1,3-dimethoxypropane,
2-isopropyl-2-isopentyl-1,3-dimethoxypropane,
2-phenyl-2-isopropyl-1,3-dimethoxypropane,
2-phenyl-2-s-butyl-1,3-dimethoxypropane,
2-benzyl-2-isopropyl-1,3-dimethoxypropane,
2-benzyl-2-s-butyl-1,3-dimethoxypropane, 2-phenyl-2-benzyl-1,3-dimethoxypropane,
2-cyclopentyl-2-isopropyl-1,3-dimethoxypropane,
2-cyclopentyl-2-s-butyl-1,3-dimethoxypropane,
2-cyclohexyl-2-isopropyl-1,3-dimethoxypropane,
2-cyclohexyl-2-s-butyl-1,3-dimethoxypropane,
2-isopropyl-2-s-butyl-1,3-dimethoxypropane,
2-cyclohexyl-2-cyclohexylmethyl-1,3-dimethoxypropane,
2,3-diphenyl-1,4-diethoxybutane,
2,3-dicyclohexyl-1,4-diethoxybutane,
2,2-dibenzyl-1,4-diethoxybutane,
2,3-dicyclohexyl-1,4-diethoxybutane,
2,3-diisopropyl-1,4-diethoxybutane,
2,2-bis(p-methylphenyl)-1,4-dimethoxybutane,
2,3-bis(p-chlorophenyl)-1,4-dimethoxybutane,
2,3-bis(p-fluorophenyl)-1,4-dimethoxybutane,
2,4-diphenyl-1,5-dimethoxypentane,
2,5-diphenyl-1,5-dimethoxyhexane,
2,4-diisopropyl-1,5-dimethoxypentane,
2,4-diisobutyl-1,5-dimethoxypentane,
2,4-diisoamyl-1,5-dimethoxypentane,
3-methoxymethyltetrahydrofuran,
3-methoxymethyldioxane,
1,3-diisobutoxypropane,
1,2-diisobutoxypropane,
1,2-diisobutoxyethane,
1,3-diisoamyloxypropane,
1,3-diisoneopentyloxyethane,
1,3-dineopentyloxypropane,
2,2-tetramethylene-1,3-dimethoxypropane,
2,2-pentamethylene-1,3-dimethoxypropane,
2,2-hexamethylene-1,3-dimethoxypropane,
1,2-bis(methoxymethyl)cyclohexane,
2,8-dioxaspiro[5,5]undecane,
3,7-dioxabicyclo[3,3,1]nonane,
3,7-dioxabicyclo[3,3,0]octane,
3,3-diisobutyl-1,5-oxononane,
6,6-diisobutyldioxyheptane,
1,1-dimethoxymethylcyclopentane,
1,1-bis(dimethoxymethyl)cyclohexane,
1,1-bis(methoxymethyl)bicyclo[2,2,1]heptane,
1,1-dimethoxymethylcyclopentane,
2-methyl-2-methoxymethyl-1,3-dimethoxypropane,
2-cyclohexyl-2-ethoxymethyl-1,3-diethoxypropane,
2-cyclohexyl-2-methoxymethyl-1,3-dimethoxypropane,
2,2-diisobutyl-1,3-dimethoxycyclohexane,
2-isopropyl-2-isoamyl-1,3-dimethoxycyclohexane,
2-cyclohexyl-2-methoxymethyl-1,3-dimethoxycyclohexane,
2-isopropyl-2-methoxymethyl-1,3-dimethoxycyclohexane,
2-isobutyl-2-methoxymethyl-1,3-dimethoxycyclohexane,
2-cyclohexyl-2-ethoxymethyl-1,3-diethoxycyclohexane,
2-cyclohexyl-2-ethoxymethyl-1,3-dimethoxycyclohexane,
2-isopropyl-2-ethoxymethyl-1,3-diethoxycyclohexane,
2-isopropyl-2-ethoxymethyl-1,3-dimethoxycyclohexane,
2-isobutyl-2-ethoxymethyl-1,3-diethoxycyclohexane,
2-isobutyl-2-ethoxymethyl-1,3-dimethoxycyclohexane,
tris(p-methoxyphenyl)phosphine,
methylphenylbis(methoxymethyl)silane,
diphenylbis(methoxymethyl)silane,
methylcyclohexylbis(methoxymethyl)silane,
di-t-butylbis(methoxymethyl)silane,
cyclohexyl-t-butylbis(methoxymethyl)silane and
i-propyl-t-butylbis(methoxymethyl)silane.

Among them, 1,3-diethers are used favorably and, in particular, 2,2-diisobutyl-1,3-dimethoxypropane, 2-isopropyl-2-isopentyl-1,3-dimethoxypropane, 2,2-dicyclohexyl-1,3-dimethoxypropane and 2,2-bis(cyclohexylmethyl)-1,3-dimethoxypropane are preferred.

The polyether compound (c-2) may be used in combination of two or more. It is also permissible to use the polyether compound (c-2) concurrently with the organosilicic compound (c-1).

As the electron donor (c), it is also possible to use concurrently therewith an organosilicic compound represented by the following formula (6).

In the formula (6), R and $R^2$ represent each a hydrocarbyl group and n is 0<n<4. The organosilicic compound of the formula (6) does not include the organosilicic compound (c-1) represented by the formula (3).

Concretely, there may be enumerated as the organosilicic compound represented by the formula (6), for example, trimethylmethoxysilane, trimethylethoxysilane, dimethyldimethoxysilane, dimethyldiethoxysilane, diisopropyldimethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bisethylphenyldimethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, n-butyltriethoxysilane, phenyltriethoxysilane, γ-aminopropyltriethoxysilane, chlorotriethoxysilane, ethyltriisopropoxysilane, vinyltributoxysilane, trimethylphenoxysilane, methyltriallyloxysilane, vinyltris(β-methoxyethoxysilane) and vinyltriacetoxysilane.

Further, as analogous compounds, ethyl silicate, butyl silicate, dimethyltetraethoxydicycloxane and so on may also be used.

For polymerizing propylene using a catalyst composed of the solid titanium catalyst component (a), the organometallic compound (b) and the electron donor (c), a prepolymerization may be incorporated. In the prepolymerization, an olefin is polymerized in the presence of a titanium-based solid catalyst component (a), an organometallic compound (b) and, if necessary, an electron donor (c).

For the olefin to be pre-polymerized, there may be used, for example, a linear olefin, such as ethylene, propylene, 1-butene, 1-octene, 1-hexadecene or 1-eicosene; or an olefin having branched structure, such as 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, allylnaphthalene, allylnorbornane, styrene, dimethylstyrenes, vinylnaphthalenes, allyltoluenes, allylbenzene, vinylcyclohexane, vinylcyclopentane, vinylcycloheptane or allyltrialkylsilanes. They may be co-polymerized.

The prepolymerization may favorably be carried out in such a manner that the polymerized product will be formed in an amount of about 0.1–1,000 g, preferably 0.3–500 g per 1 g of the titanium-based solid catalyst component (a). If the pre-polymerized amount is too large, the efficiency for producing the (co)polymer in the inherent polymerization may decrease.

In the prepolymerization, the catalyst may be used at a concentration considerably higher than that in the system of the inherent polymerization. The titanium-based solid catalyst component (a) may favorably be incorporated usually in a concentration of about 0.01–200 mmol, preferably about 0.05–100 mmol, calculated as the titanium atom, per one liter of the polymerization volume. The organometallic compound (b) may favorably be incorporated usually in an amount of about 0.1–100 mmol, preferably about 0.5–50 mmol, per one mole of titanium atom in the titanium-based solid catalyst component (a). The electron donor (c) may not necessarily be used in the prepolymerization, though it may be incorporated in an amount of about 0.1–50 moles, preferably 0.5–30 moles, more preferably 1–10 moles, per one mole of titanium atom in the titanium-based solid catalyst component (a).

The prepolymerization may favorably be carried out under a mild condition by adding the olefin to be prepolymerized and the catalyst components to an inert hydrocarbon medium. As the inert hydrocarbon medium, there may be used aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride and chlorobenzene; and mixtures of them. Especially, aliphatic hydrocarbons are favorable to be used.

For the prepolymerization temperature, any temperature at which the prepolymer will not dissolve substantially in the inert hydrocarbon medium may be employed and, usually, a temperature of −20 to +100° C., preferably −20 to +80° C., more preferably 0 to +40° C., may be employed. The prepolymerization may be carried out in a batchwise or continuous process or otherwise. It is possible that a molecular weight regulation is incorporated using hydrogen gas or other means.

In the intrinsic polymerization, it is favorable to employ the titanium-based solid catalyst component (a) (or the catalyst for the prepolymerization) in an amount of about 0.0001–50 mmol, preferably about 0.001–10 mmol, calculated as titanium atom, per one liter of the polymerization volume. The organometallic compound (b) may favorably be used in an amount of about 1–2,000 moles, preferably about 2–500 moles, as calculated for the atomic weight of the metal per one mole of titanium atom in the polymerization system. The electron donor (c) may favorably be used in an amount of about 0.001–50 moles, preferably about 0.01–20 moles, per one mole of the metal atom of the organometallic compound (b).

On producing the polypropylene resin composition according to the present invention, it is preferable to produce the higher molecular weight polypropylene (A) and the lower molecular weight polypropylene (B) by a multistage polymerization of at least two stages, in particular in a continuous multistage polymerization, in order to obtain finally the polypropylene resin composition containing these polypropylenes of different molecular weights. It is favorable herein to first produce the higher molecular weight polypropylene (A) and, then, to produce the lower molecular weight polypropylene (B), since thereby an easy control of the molecular weight is attainable. Here, the polymer molecular weight in each stage can be adjusted by, for example, altering the amount of hydrogen gas supplied to the polymerization system.

The polymerization may be effected either in a gas phase polymerization or in a liquid phase polymerization including block polymerization, solution polymerization and suspension polymerization, wherein each stage may be realized in a different way. It may be performed either in a batchwise, continuous or semicontinuous way, though continuous process is preferred. Each of the stages may be performed in a plurality of polymerization reactors, for example, in 2–10 reactors.

As the polymerization medium, inert hydrocarbon may be used and propylene in liquid state may be used therefor. The polymerization condition may be selected adequately within the ranges for the polymerization temperature of about −50° C.~200° C., preferably about 20° C.~100° C., and for the polymerization pressure of normal pressure ~9.8 MPa (normal pressure ~100 kgf/cm$^2$ gauge), preferably 0.20~4.9 MPa (about 2~50 kgf/cm$^2$ gauge).

When a prepolymerization catalyst is employed, the titanium-based solid catalyst component (a) and the organometallic compound (b) may be added renewedly on requirement. The organometallic compound (b) used upon the prepolymerization and that used upon the intrinsic polymerization may be identical with or different from each other. The electron donor (c) must be used at least once in either the prepolymerization or the intrinsic polymerization, namely, it is used either only in the intrinsic polymerization or both in the prepolymerization and in the intrinsic polymerization. The electron donor (c) used upon the prepolymerization and that used upon the intrinsic polymerization may be identical with or different from each other. While it is permissible that these catalyst components are not replenished on each of the subsequent stages after the polymerization in the foregoing stage, they may be replenished adequately.

When the catalyst as described above is used, the resulting polypropylene-based resin composition will not suffer from any deterioration in the crystallinity or the stereospecificity index and no decrease in the activity of the catalyst is encountered, even in the case of using hydrogen upon the polymerizarion.

By the production process as described above, the content of the catalyst, especially of halogen in the polypropylene resin composition can relatively be decreased, since the polypropylene resin composition can be produced at a high yield per a unit amount of the titanium-based solid catalyst component (a). Therefore, the procedure for removing the catalyst in the polypropylene resin composition can be dispensed with and, at the same time, corrosion of the metal mold for molding formed articles using the finally obtained polypropylene resin composition will difficultly occur.

The polypropylene resin composition according to the present invention can be produced in various ways, for example, by irradiating a lower molecular weight polypropylene by a radiant ray to cause cross linking thereof or by subjecting a part of a lower molecular weight polypropylene to a cross linking using a cross linking agent, in order to convert a part of a lower molecular weight polypropylene into a higher molecular weight polypropylene, although such a technique may render the production bothersome and cause the control of molecular weight to be difficult and, therefore, preference is given to the multistage polymerization described above.

The polypropylene resin composition according to the present invention may contain an additive of inorganic filler (C). When the inorganic filler (C) is incorporated, an improvement in the stiffness, elongation and heat resistance may result.

The amount of the inorganic filler (C) to be blended may favorably be such that the specific gravity (ASTM D 1505) of the polypropylene resin composition will be at most 0.930, preferably at most 0.927 and more preferably at most 0.925. Such amount of the inorganic filler (C) as achieving the specific gravity mentioned above may usually be in the order of 0–5% by weight, preferably of 1–3% by weight, as the content in the polypropylene resin composition according to the present invention. If the content of the inorganic filler (C) is in this order, the scratch-proof property will, in general, not be deteriorated but held better.

Concrete examples of the inorganic filler (C) include talc, silica, mica, calcium carbonate, glass fiber, glass beads, barium sulfate, magnesium hydroxide, wollastonite, calcium silicate fiber, carbon fiber, magnesium-oxy sulfate fiber, potassium titanate fiber, titanium oxide, calcium sulfite, white carbon, clay and calcium sulfate. The inorganic filler (C) may be incorporated either solely or in combination of two or more kinds. Among these inorganic fillers (C), talc may favorably be incorporated, since an improvement in the stiffness and in the impact resistance of the molded product will be attained by using talc. In particular, a talc product having an average particle size of 0.1–3 $\mu$m, preferably 0.5–2.5 $\mu$m, is used favorably, since a marked contribution to the improvement in the stiffness and in the impact strength will be attained.

The polypropylene resin composition according to the present invention may contain a nucleating agent (D). For example, it may contain, as the nucleating agent (D), the prepolymer described previously or other known nucleating agents or, further, the prepolymer together with other nucleating agent. By containing or compounding the nucleating agent (D), the crystal grains will become finely dispersed and the crystallization velocity will also be increased, with the result of permission of high speed molding and molded articles of superior stiffness and superior heat resistance (especially under a high load).

As the nucleating agent (D) other than the above-mentioned prepolymer, there may be employed known nucleating agents, for example, organic nucleating agents, such as those based on phosphate and based on sorbitol, metal salts of aromatic carboxylic acids, metal salts of aliphatic carboxylic acids and compounds based on rosin; and inorganic nucleating agents, such as inorganic compounds, without special limitation. Concrete examples include NA-11UY (trademark, a metal salt of an organo-phosphorus compound of Asahi Denka Kogyo K.K.), PINECRYSTAL KM 1610 (trademark, a nucleating agent based on rosin of Arakawa Chemical Inc., Ltd.) and so on. The nucleating agent (D) may be incorporated either solely or in a combination of two or more kinds.

The amount of the nucleating agent (D) to be blended may favorably be 0–1% by weight in general, preferably 0.1–0.5% by weight, of the polypropylene resin composition according to the present invention.

While it is possible to incorporate either one or both of the inorganic filler (C) and the nucleating agent (D), a polypropylene resin composition superior in the balance between the stiffness and the heat resistance, especially the heat distortion temperature under a high load (1.81 MPa) can be obtained, in particular, when they are incorporated in combination.

The polypropylene resin composition according to the present invention may contain, if necessary, additives, rubbers and other polymers, such as conventional polypropylene, within a range not obstructing the purpose of the present invention. Thus, for example, it is possible to blend therewith suitably a rubber component for improving the impact strength.

Concrete examples of such rubber component include non-crystalline or low-crystalline α-olefin copolymers having no diene component, such as ethylene/propylene copolymer rubber, ethylene/1-butene copolymer rubber, ethylene/1-octene copolymer rubber and propylene/ethylene copolymer rubber; ethylene/propylene/dicyclopentadiene copolymer rubber; ethylene/propylene/non-conjugated diene copolymer rubber, such as ethylene/propylene/1,4-hexadiene copolymer rubber, ethylene/propylene/cyclooctadiene copolymer rubber, ethylene/propylene/methylenenorbornene copolymer rubber and ethylene/propylene/ethylidenenorbornene copolymer rubber; and ethylene/butadiene copolymer rubber.

As the additives, there may be enumerated, for example, antioxidant, hydrochloric acid absorber, heat stabilizer, anti-weathering agent, light stabilizer, UV-absorber, slipping agent, anti-blocking agent, antifogging agent, lubricating agent, antistatic agent, fire retardant, pigments, colorants, dispersant, copper-sequestering agent, neutralizing agent, foaming agent, plasticizer, bubble preventing agent, cross linking agent, flowability improving agent, such as peroxides, weld strength improving agent, natural petroleum oils, synthetic oils and waxes.

The polypropylene resin composition according to the present invention is light-weighing, exhibits considerable high values of stiffness and heat stability and is superior in the scratch-proof property with better flowability upon molding. It does not cause cracking upon molding due to its greater elongation at break and exhibits superior moldability. It is superior also in the impact resistance, surface gloss, resistance to chemicals and abrasion resistance.

The polypropylene resin composition according to the present invention can be utilized favorably as the raw resin material in application fields where the above-mentioned properties, especially higher stiffness, higher heat resistance and a scratch-proof property are required, in particular, as the raw resin material for injection molding, though it can be used also as the raw resin material for applications other than injection molding. It can be utilized as an alternative for the conventional polypropylene resin composition in which inorganic fillers including talc are incorporated in a considerable amount. It can respond to the existing needs in the market for environmental accessibility and for recycled use.

When the polypropylene resin composition according to the present invention or a resin blend thereof with other ingredient(s) is used as the raw resin material for injection molding, an injection-molded article of complicate configuration or of large size with superior characteristic features, which may have a flexural modulus (ASTM D 790) of at least 2,700 MPa, an elongation at break (ASTM D 638) of 7% or higher and a heat distortion temperature (ASTM D 648, under a load of 0.45 MPa) of at least 145° C., can be obtained easily and efficiently, since the resin composition is superior in the flowability as large as, for example, at least 85 cm expressed as the flow length. Further, a light weighing injection-molded article of a specific gravity (ASTM D 1505) of 0.930 or less having the superior properties as above can be obtained. Also, an injection-molded article, which has, in addition to the characteristic properties mentioned above and the specific gravity value as above, a pencil hardness of F or harder {JIS K-5400, under a load of 9.8 N (1 kgf)} and a color difference value ΔE* after scratch test of 8.0 or lower, can be obtained with superior scratch-proof property.

The flexural modulus and the heat distortion temperature of the so-obtained injection-molded article may correspond to the stiffness and heat resistance of a composition prepared from a known polypropylene resin with addition of a large amount, for example, 15–20% by weight, of inorganic filler, such as talc. The elongation at break is observed, in which the test specimen breaks off on the tensile test at a strain corresponding to the yield point or at a strain beyond the yield point, so that damage of the injection molded product, such as cracking, will not occur during or after the injection molding.

The specific gravity of a resin composition composed of a conventional polypropylene resin with addition of a large amount, for example, 15–20% by weight, of inorganic filler, such as talc, may reach as high a value as exceeding over 1.00, whereas the polypropylene resin composition according to the present invention exhibits a low specific gravity and, thus, a considerable reduction of weight is attained.

The pencil hardness is a measure indicating the susceptibility of the surface of molded article to scratch. The pencil hardness of the molded article according to the present invention is harder than conventional one, showing a higher resistance to scratch.

The color difference value $\Delta E^*$ after scratch test is a measure of conspicuousness of scratch marks. This value is higher as compared with conventional product with addition of large amount of, such as, talc, indicating a higher resistance to scratch and lower conspicuousness of scratch marks.

In using the polypropylene resin composition according to the present invention as the raw resin material for injection molding a formed article, other components, such as the rubber component mentioned above, additives and so on, may be compounded with the raw resin material. By blending a rubber component with the resin composition, the impact strength of the molded article can be improved. By adding a grade of talc, especially one which has the average particle size given above, the stiffness and the impact strength of the molded article can be improved.

If the injection-molded article is a part element of automobile or a household commodity, it is favorable to compound 40–100 parts by weight, preferably 55–85 parts by weight, of the polypropylene resin composition according to the present invention, 0–50 parts by weight, preferably 10–35 parts by weight, of the rubber component mentioned above and 0–60 parts by weight, preferably 5–25 parts by weight, of the inorganic filler, with the total sum of these three components amounting to 100 parts by weight. In the case of, in particular, trims of automobile, it is favorable to compound 50–100 parts by weight of the polypropylene resin composition according to the present invention, 0–40 parts by weight, preferably 0–25 parts by weight, of the rubber component mentioned above and 0–40 parts by weight, preferably 0–25 parts by weight, of the above-mentioned inorganic filler. When the polypropylene resin composition according to the present invention is employed, it is permissible to incorporate inorganic filler in an amount smaller than that for conventional polypropylene product, whereby a weight reduction and prevention of flow marks can be attained.

For the raw resin material for injection molding, it is possible to blend, for example, 0.05–1 part by weight of an antioxidant, 0–1 part by weight of a light stabilizer, 0–1 part by weight of a UV-absorber, 0–1 part by weight of an antistatic agent, 0–1 part by weight of a lubricating agent and 0–1 part by weight of a copper-sequestering agent per 100 parts by weight of the polypropylene resin composition according to the present invention.

The polypropylene resin composition according to the present invention can be utilized as a resin modifier for improving the stiffness, heat resistance, flowability, susceptibility to flow mark and so on, by admixing it to a conventional polypropylene resin. While there is no limitation in the mixing proportion, it is preferable usually to add the polypropylene resin composition according to the present invention in an amount of 1–100 parts by weight to 100 parts by weight of the conventional polypropylene resin.

The injection molded articles according to the present invention are those which are produced by injection-molding the polypropylene resin composition according to the present invention or a resin composition prepared by blending the polypropylene resin composition with other component(s). The injection-molded articles according to the present invention can be obtained by injection-molding the raw resin material into contemplated configurations using a known injection molding apparatus under a condition known per se. The injection-molded articles according to the present invention are light-weighing, exhibit considerable high values of stiffness and heat stability and are superior in the scratch-proof property, together with superiorities in the impact strength without causing crack formation on the molding, in the surface gloss, in the resistance to chemicals, in the abrasion resistance and in the appearance, so that they are well suited for use as automobile parts, household electric instruments and other molded articles.

Representative examples of the injection molded articles according to the present invention include automobile interior articles, such as armrest, indicator panel lower, indicator panel core, indicator panel upper, car cooler housing, console box, glove outdoor, glove box, trims, door trim, door pocket, speaker grill, high mount, relay fuse box, lamp housing, meter case, meter hood, pillar and center pillar; automobile exterior articles, such as bumper, front grill sides, license plate, louver garnish, side molding, bumper corner, bumper sides and side mudguard; other automobile parts, such as air cleaner case, junction box, sirocco fan, corrugate tubes, connectors, fan shroud, protectors, lamp housing, reserve tank (cap), air cleaner and battery case; household commodities, such as cleaner pipes, parts of dish-washer, parts of laundry machine, housings, hotplates, cleaner body and rice cooker body, parts of air conditioner, parts of illuminating instruments, parts of personal computer, parts of audioinstruments, telephone casing and ventilator fan; kitchinwares, such as cup, dish, bowl, lunch pack and chopsticks; vessels, such as portable tank for burning oil, bucket, detergent container, cup for hairdressing paste, container for food and lighter case; furnitures, such as bookshelf, rack for apparels, plate rack, closet and table; office furnitures, such as desks and chairs; architectural materials, such as floor, wall, roof and pillar; clerical goods, such as mechanical pencil case and scale; medical utilities, such as syringe; household goods, such as bath tub, bath tub cover, shunk of toothbrush and basket; and others including daily neccesaries and miscellaneous, such as cap, bicycle frame, connector, container, pallet, flowerpot and toys.

As described above, the polypropylene resin compositions according to the present invention has specific material properties and, therefore, it is light-weighing, exhibits very high stiffness and heat stability and are superior in the scratch-proof property and in the moldability with better flowability without cracking upon molding. Therefore, the molded articles made of the polypropylene resin composition according to the present invention can be designed with thinner wall thicknesses and lower weight than conventional resin molded products.

The injection-molded articles according to the present invention are made of the polypropylene resin composition of the present invention described above, so that they are light-weighing, exhibit quite high stiffness and heat stability and are superior in the scratch-proof property and in the appearance and obtainable by molding at an efficient productivity without occurrence of cracking.

THE BEST MODE FOR EMBODYING THE INVENTION

Below, the present invention is described by way of Examples. The methods for testing the material properties are as follows:

Isotactic pentad fraction (mmmm-fraction) was determined as the fraction of mmmm-peaks in the entire absorption peaks within the methyl carbon region in the $^{13}$C-NMR spectrum.

Mw/Mn and Mz/Mw were determined by gel permeation chromatography.

Flexural modulus was determined under the condition according to ASTM D 790.

Elongation at break was determined under the condition according to ASTM D 638.

Heat distortion temperature was determined under the condition of a load of 0.45 MPa or 1.18 MPa according to ASTM D 648.

Flowability was determined using a flow length testing mold having a spiral flow path of a depth of 3 mm, a width of 10 mm and a length of 2,000 mm by performing an injection molding at a resin temperature of 210° C. and at a mold temperature of 40° C. to observe the flow length (the length of spiral flow).

Specific gravity was determined by water-displacement method under the condition according to ASTM D 1505.

Pencil hardness was determined according to JIS K-5400 by a visual judgement by scratching the test surface with pencil under a condition of a load of 9.8 N (1 kgf) in the direction of flow of molding.

Color difference value ΔE* after scratch test was determined in the manner in which 21 scratch lines were formed on the molded article in the flow direction of molding at an interval of 1 mm each in a length of 6 cm using a wolfram alloy steel needle (Grade 2 of JIS G4404 SK2) under a condition of a load of 0.98 N (100 gf) and the difference ΔE* of the color values was detected by a color-difference meter (SM Color Computer of Suga Testing Machine K.K.) before and after the scratch lines were formed, using a white plate (X=77.55, Y=80.28 and Z=93.51) as the color standard.

Melt flow rate was determined according to ASTM D 1238 under a condition of 230° C., 2.16 kg load.

Izod impact strength was determined under the condition according to ASTM D 256 with after-formed notch.

Intrinsic viscosity was determined in decalin at 135° C.

PRODUCTION EXAMPLE 1

<<Preparation of Solid Titanium Catalyst Component 1>>

A vibration mill was provided for, which was equipped with four crushing pots each having an inner volume of 4 liters and containing therein 9 kg of steel balls of 12 mm diameter. Each pot was charged, under a nitrogen atmosphere, with 300 g of anhydrous magnesium chloride, 115 ml of diisobutyl phthalate and 60 ml of titanium tetrachloride and the contents was crushed therein for 40 hours. Five grams of the resulting co-crushed mass were placed in a 200 ml flask, whereto 100 ml of toluene were added and the mixture was then agitated at 114° C. for 30 minutes. The resulting mixture was then stood still and the supernatant liquid was removed. Subsequently, the solid matter was washed with 100 ml of n-heptane at 20° C. Washing was effected three times. Then, the so-washed solid matter was dispersed in 100 ml of n-heptane to obtain a slurry of solid titanium catalyst component 1. The resulting solid titanium catalyst component 1 had a content of titanium of 2.0% by weight and a content of diisobutyl phthalate of 18% by weight.

PRODUCTION EXAMPLE 2

An autoclave having an inner volume of 200 liters was charged with 250 g of the solid titanium catalyst component 1 prepared in Production Example 1, 32.1 g of triethylaluminum (abbreviated in the following occasionally as TEA) and 125 liters of heptane. Thereto were then supplied 1250 g of propylene while maintaining the internal temperature at 10° C. and the contents were agitated for 30 minutes, whereupon 18 g of titanium tetrachloride were added thereto, in order to obtain a slurry of a pre-polymerized catalyst component 2.

EXAMPLE 1

A polypropylene resin composition was produced by a two-stage continuous polymerization process using one polymerization reactor in the polymerization of the first stage and four polymerization reactors in the polymerization of the second stage. Thus, to a polymerization reactor 1 having an internal volume of 500 liters, there were supplied 99 liters per hour of heptane and, as the catalyst, 5.5 grams per hour of the pre-polymerized catalyst component 2 obtained in Production Example 2, 10.1 grams per hour of triethylaluminum and 20.3 grams per hour of dicyclopentyldimethoxysilane (abbreviated in the following occasionally as DCPMS) continuously, whereto propylene was supplied continuously while maintaining the internal pressure of the reactor-1 at 0.52 MPa (5.4 kgf/cm$^2$, gauge) at a temperature of 55° C. under a condition of substantial absence of hydrogen (polymerization in the first stage). A sample of the slurry formed in the reactor 1 was collected to determine the intrinsic viscosity [η] of the resulting polypropylene, which gave a value of 8.6 dl/g.

The polymerization in the second stage was performed in a continuous process using four polymerization reactors. Thus, the slurry formed in the reactor 1 of the first stage polymerization was transferred continuously first to a polymerization reactor 2 having an internal volume of 500 liters to subject it to a further polymerization therein. To the reactor 2 were supplied continuously 10.7 liters per hour of heptane, while supplying thereto continuously propylene and hydrogen so as to maintain the reactor 2 at a temperature of 70° C., under an inner pressure of 0.48 MPa (5.0 kgf/cm$^2$, gauge) and at a hydrogen concentration in the gas phase of 13.3 vol.-%. Then, the resulting slurry in the reactor 2 was transferred continuously to a polymerization reactor 3 having an internal volume of 500 liters, in order to subject it to a further polymerization. To the reactor 3 were supplied continuously 25.1 liters per hour of heptane, while supplying thereto continuously propylene and hydrogen so as to maintain the reactor 3 at a temperature of 70° C., under an inner pressure of 0.44 MPa (4.6 kgf/cm$^2$, gauge) and at a hydrogen concentration in the gas phase of 12.6 vol.-%.

Thereafter, the resulting slurry in the reactor 3 was transferred continuously to a polymerization reactor 4 having an internal volume of 500 liters, in order to subject it to a further polymerization. To the reactor 4 were supplied continuously 17.8 liters per hour of heptane, while supplying thereto continuously propylene and hydrogen so as to maintain the reactor 4 at a temperature of 70° C., under an inner pressure of 0.36 MPa (3.7 kgf/cm$^2$, gauge) and at a hydrogen concentration in the gas phase of 12.8 vol.-%. Then, the resulting slurry in the reactor 4 was transferred continuously to a polymerization reactor 5 having an internal volume of 275 liters, in order to subject it to a further polymerization. To the reactor 5 were supplied continuously 8.8 liters per hour of heptane, while supplying thereto continuously propylene and hydrogen so as to maintain the reactor 5 at a temperature of 70° C., under an inner pressure of 0.17 MPa (1.7 kgf/cm$^2$, gauge) and at a hydrogen concentration in the gas phase of 12.6 vol.-%.

The slurry exhausted from the reactor 5 was subjected to a centrifugation in an ordinary manner after it was freed from the unreacted monomer, whereupon the so-separated solid matter was dried under a pressure of 9,300 Pa (70 mmHg, gauge) at 80° C. for 10 hours to obtain a powdery polypropylene resin composition. This powdery composition was produced at a throughput of 77 kg/hr.

The so-obtained polypropylene resin composition had an MFR of 15.3 g/10 min. The proportion of the polypropylene formed in the first stage polymerization relative to the finally obtained polypropylene resin composition was calculated from the material balance to be 11.6% by weight. The results of examinations for this polypropylene resin composition were as given below:

Isotactic pentad fraction=98.0%
Intrinsic viscosity [η] of the polypropylene resin composition=2.20 dl/g
(intrinsic viscosity [η] determined in tetralin at 135° C.=1.73 dl/g)
Intrinsic viscosity [η] of the higher molecular weight component=8.6 dl/g
(intrinsic viscosity [η] determined in tetralin at 135° C.=7.1 dl/g)
Content of the higher molecular weight component= 11.6% by weight
Intrinsic viscosity [η] of the lower molecular weight component=1.33 dl/g
(intrinsic viscosity [η] determined in tetralin at 135° C.=0.98 dl/g)
Content of the lower molecular weight component=88.4% by weight
MFR=15.3 g/10 min.
Mw/Mn=10.7
Mz/Mw=6.0

100 parts by weight of the above-obtained powdery polypropylene resin composition, 0.2 part by weight of an antioxidant based on phosphorus, 0.4 part by weight of an antioxidant based on phenol, 0.05 part by weight of calcium stearate as neutralizing agent and 2 parts by weight of talc LMS-300 (trademark, a product of Fuji Talc K.K. having an average particle size of 1.3 to 1.6 μm) were blended on a 20 liter tumbler mixer for 10 minutes, whereupon the mixture was extruded by an anisotropic high speed twin-screw extruder of 65 mm φ (2UCM-Φ65EXT (trademark) of Ube Industries, Ltd.) at 200° C. to obtain a pelletized product. The pelletized product had an MFR of 13.9 g/10 min., an Mw/Mn value of 10.7 and an Mz/Mw value of 6.0.

From the pelletized product, specimens for testing the material properties were produced by injection molding on an injection molding machine of model J 100 SA II supplied from The Japan Steel Works, Ltd. at an injection temperature of 210° C. and a mold temperature of 60° C. with a cooling time of 30 seconds. For these injection-molded specimens, elongation at break, flexural modulus, Izod impact strength, heat distortion temperature under 0.45 MPa and heat distortion temperature under 1.81 MPa were estimated according to the testing methods given above. Also, testing was made for the flow length in accordance with the testing method therefor given above for assessing the flowability. Further, a test injection molding was carried out for examining occurrence of cracking upon molding under severe conditions of an injection temperature of 190° C., a mold temperature of 30° C. and a cooling time of 300 seconds, wherein a flat plate having a thickness of 3 mm was produced by the injection molding to examine occurrence of crack and rupture in the molded plate, wherefor an evaluation criterium for the moldability was used in which the molded plate showing, after termination of cooling, any crack or rupture is indicated by a mark × and that showing no crack nor rupture is indicated by a mark ○. Moreover, scratch-proof property was examined in such a manner that a flat plate having a thickness of 3 mm, a width in the MD-direction of 14 cm and an extension in TD-direction of 14 cm was produced, by injection molding using an injection molding machine of model UBEMAX D150-14 10 (trademark) of Ube Industries, Ltd. at an injection temperature of 210° C. and a mold temperature of 60° C. with a cooling time of 20 seconds, from the pelletized product under addition of 1% by weight of a master-batch (carbon content of 30% by weight) of a pigment (black), whereupon the color difference ΔE* after scratch test was observed with this plate by the testing method given above. The test results were as given below:

MFR=13.9 g/10 min.
Mw/Mn=10.7
Mz/Mw=6.0
Specific gravity=0.921
Elongation at break=14%
Flexural modulus=2,870 MPa
Izod impact strength=20 J/m
Heat distorsion temperature (0.45 MPa)=150° C.
Heat distorsion temperature (1.81 MPa)=98° C.
Flowability (210° C.)=93 cm
Pencil hardness=F
ΔE*=5.0
Moldability=○

EXAMPLE 2

The same procedures as in Example 1 were pursued except that the amount of addition of the talc was changed to 1.5 parts by weight. The resulting pelletized product had an MFR of 14.0 g/10 min., an Mw/Mn value of 10.7 and an Mz/Mw value of 6.0. Evaluation tests for the injection-molded specimens produced from the resulting pelletized product were carried out as in Example 1. The results of tests were as given below:

MFR=14.0 g/10 min.
Mw/Mn=10.7
Mz/Mw=6.0
Specific gravity=0.918
Elongation at break=15%
Flexural modulus=2,720 MPa
Izod impact strength=19 J/m
Heat distorsion temperature (0.45 MPa)=147° C.
Heat distorsion temperature (1.81 MPa)=96° C.
Flowability (210° C.)=94 cm
Pencil hardness=F
ΔE*=4.6
Moldability=○

EXAMPLE 3

100 parts by weight of the powdery polypropylene resin composition obtained in Example 1, 0.1 part by weight of an antioxidant based on phosphorus, 0.2 part by weight of an antioxidant based on phenol, 0.05 part by weight of calcium stearate as neutralizing agent and 0.2 part by weight of NA-11UY (trademark, a product of Asahi Denka Kogyo K.K.) as a nucleating agent were blended on a 20 liter Henschel mixer for 2 minutes, whereupon the mixture was extruded using a single screw extruder of 65 mm φ (of Ishinaka Tekkojo K.K.) at 220 20 C. to obtain a pelletized product. The pelletized product had an MFR of 14.5 g/10 min., an Mw/Mn value of 10.7 and an Mz/Mw value of 6.0. Evaluation tests for the injection-molded specimens produced from the resulting pelletized product were carried out as in Example 1. The results of tests were as given below:

MFR=14.5 g/10 min.
Mw/Mn=10.7
Mz/Mw=6.0
Specific gravity=0.911
Elongation at break=11%
Flexural modulus=2,775 MPa
Izod impact strength=8 J/m
Heat distorsion temperature (0.45 MPa)=150° C.
Heat distorsion temperature (1.81 MPa)=106° C.
Flowability (210° C.)=97 cm
Pencil hardness=H
ΔE*=3.7
Moldability=○

EXAMPLE 4

100 parts by weight of the powdery polypropylene resin composition obtained in Example 1, 0.2 part by weight of an antioxidant based on phosphorus, 0.4 part by weight of an antioxidant based on phenol, 0.05 part by weight of calcium stearate as neutralizing agent, 0.2 part by weight of NA-11UY (trademark, a product of Asahi Denka Kogyo K.K.) as a nucleating agent and 2 parts by weight of TALC LMS-300 (trademark, a product of Fuji Talc K.K. with an average particle size of 1.3–1.6 μm) were blended on a 20 liter Henschel mixer for 2 minutes, whereupon the mixture was extruded using an anisotropic high speed twin-screw extruder of 65 mmφ (2UCM-Φ 65EXT (trademark) of Ube Industries, Ltd.) at 200° C. to obtain a pelletized product. The pelletized product had an MFR of 13.0 g/10 min., an Mw/Mn value of 10.7 and an Mz/Mw value of 6.0. Evaluation tests for the injection-molded specimens produced from the resulting pelletized product were carried out as in Example 1. The results of tests were as given below:

MFR=13.0 g/10 min.
Mw/Mn=10.7
Mz/Mw=6.0
Specific gravity=0.925
Elongation at break=11%
Flexural modulus=3,025 MPa
Izod impact strength=20 J/m
Heat distorsion temperature (0.45 MPa)=152° C.
Heat distorsion temperature (1.81 MPa)=111° C.
Flowability (210° C.)=93 cm
Pencil hardness=H
ΔE*=4.8
Moldability=○

EXAMPLE 5

The same procedures as in Example 4 were pursued except that the amount of addition of the talc was changed to 1 part by weight. The resulting pelletized product had an MFR of 12.0 g/10 min., an Mw/Mn value of 10.7 and an Mz/Mw value of 6.0. Evaluation tests for the injection-molded specimens produced from the resulting pelletized product were carried out as in Example 1. The results of tests were as given below:

MFR=12.0 g/10 min.
Mw/Mn=10.7
Mz/Mw=6.0
Specific gravity=0.919
Elongation at break=11%
Flexural modulus=3,030 MPa
Izod impact strength=21 J/m
Heat distorsion temperature (0.45 MPa)=148° C.
Heat distorsion temperature (1.81 MPa)=107° C.
Flowability (210° C.)=93 cm
Pencil hardness=F
ΔE*=4.2
Moldability=○

EXAMPLE 6

100 parts by weight of the powdery polypropylene resin composition obtained in Example 1, 0.2 part by weight of an antioxidant based on phosphorus, 0.4 part by weight of an antioxidant based on phenol, 0.1 part by weight of calcium stearate as neutralizing agent, 0.1 part by weight of hydrotalcite, 0.2 part by weight of PINECRYSTAL KM 1500 (trademark, a product of Arakawa Chemical Ind., Ltd.) as a nucleating agent and 2 parts by weight of talc LMS-300 (trademark, a product of Fuji Talc K.K. with average particle size of 1.3 to 1.6 μm) were blended on a 20 liter Henschel mixer for 2 minutes, whereupon the mixture was extruded using an anisotropic high speed twin-screw extruder of 65 mm φ (2UCM-Φ 65EXT (trademark) of Ube Industries, Ltd.) at 200° C. to obtain a pelletized product. The pelletized product had an MFR of 13.2 g/10 min., an Mw/Mn value of 10.7 and an Mz/Mw value of 6.0. Evaluation tests for the injection-molded specimens produced from the resulting pelletized product were carried out as in Example 1. The results of tests were as given below:

MFR=13.2 g/10 min.
Mw/Mn=10.71
Mz/Mw=6.0
Specific gravity=0.923
Elongation at break=11%
Flexural modulus=2,954 MPa
Izod impact strength=21 J/m
Heat distorsion temperature (0.45 MPa)=148° C.
Heat distorsion temperature (1.81 MPa)=107° C.
Flowability (210° C.)=93 cm
Pencil hardness=F
ΔE*=5.0
Moldability=○

EXAMPLE 7

The same procedures as in Example 6 were pursued except that 0.5 part by weight of PINECRYSTAL KM 1610 (trademark, Arakawa Chemical Ind., Ltd.) was used in the place of PINECRYSTAL KM 1500. The resulting pelletized product had an MFR of 14.2 g/10 min., an Mw/Mn value of 10.7 and an Mz/Mw value of 6.0. Evaluation tests for the injection-molded specimens produced from the resulting pelletized product were carried out as in Example 1. The results of tests were as given below:

MFR=14.2 g/10 min.
Mw/Mn=10.7
Mz/Mw=6.0
Specific gravity=0.924
Elongation at break=13%
Flexural modulus=2,994 MPa
Izod impact strength=20 J/m
Heat distorsion temperature (0.45 MPa)=150° C.
Heat distorsion temperature (1.81 MPa)=108° C.
Flowability (210° C.)=94 cm
Pencil hardness=F
ΔE*=4.8
Moldability=○

EXAMPLE 8

A polymerization reactor having an inner volume of 3,430 liters was charged under a nitrogen atmosphere with 1180 liters of heptane, 137 grams of diluted triethylaluminum, 275 grams of DCPMS and, as the catalyst, 72.2 grams of catalyst component 1 obtained in Production Example 1. After the nitrogen gas in the polymerization reactor had been exhausted using a vacuum pump, the reactor was charged with propylene, whereupon the temperature of the reactor was started to be elevated. At 60° C., propylene was supplied thereto continuously so as to maintain the reactor internal pressure at 0.38 MPa (3.9 kgf/cm², gauge) and the polymerization was continued for 0.95 hour under a condition of substantial absence of hydrogen (the first stage polymerization was over). By sampling a part of the slurry in the polymerization reactor and examining it after completion of the first stage polymerization, the resulting polypropylene had an intrinsic viscosity [η] of 8.0 dl/g.

The temperature of the polymerization reactor was then elevated to 70° C. and thereto were supplied propylene and hydrogen gas continuously in such a manner that the polymerization reactor internal pressure was kept at 0.51 MPa (5.2 kgf/cm², gauge) and the hydrogen gas concentration in the gas phase was maintained at 36.7 vol. % so as to proceed the polymerization for 4.25 hours (the second stage polymerization was over). After the polymerization, 144 ml of methanol were added to the reactor to terminate the polymerization, whereupon purification and drying of the polymer product were effected in conventional procedures and 631 kg of a powdery polypropylene resin composition were obtained.

The MFR of the resulting polypropylene resin composition was found to be 31.4 g/10 min. The proportion of the polypropylene formed in the first stage polymerization relative to the finally obtained polypropylene resin composition was calculated from the material balance to be 15% by weight. The test results were as given below:

Isotactic pentad fraction=98.4%
Intrinsic viscosity [η] of the polypropylene resin composition=1.97 dl/g
(intrinsic viscosity [η] determined in tetralin at 135° C.=1.59 dl/g)
Intrinsic viscosity [η] of the higher molecular weight component=8.0 dl/g
(intrinsic viscosity [η] determined in tetralin at 135° C.=6.5 dl/g)
Content of the higher molecular weight component=15% by weight
Intrinsic viscosity [η] of the lower molecular weight component=0.91 dl/g
(intrinsic viscosity [η] determined in tetralin at 135° C.=0.73 dl/g)
Content of the lower molecular weight component=85% by weight
MFR=31.4 g/10 min.
Mw/Mn=9.7
Mz/Mw=5.8

100 parts by weight of the above-obtained powdery polypropylene resin composition, 0.2 part by weight of an antioxidant based on phosphorus, 0.4 part by weight of an antioxidant based on phenol, 0.05 part by weight of calcium stearate as neutralizing agent and 2 parts by weight of talc LMS-300 (trademark, a product of Fuji Talc K.K. having an average particle size of 1.3 to 1.6 g m) were blended on a 20 liter tumbler mixer for 10 minutes, whereupon the mixture was extruded by an anisotropic high speed twin-screw extruder of 65 mm φ (2UCM-Φ 65EXT (trademark) of Ube Industries, Ltd.) at 230° C. to obtain a pelletized product. The pelletized product had an MFR of 25.9 g/10 min., an Mw/Mn value of 9.7 and an Mz/Mw value of 5.8. The evaluation tests for the resulting injection molded product were carried out in the same manner as in Example 1. The test results were as given below:

MFR=25.9 g/10 min.
Mw/Mn=9.7
Mz/Mw=5.8
Specific gravity=0.921
Elongation at break=8%
Flexural modulus=3,077 MPa
Izod impact strength=15 J/m
Heat distorsion temperature (0.45 MPa)=149° C.
Heat distorsion temperature (1.81 MPa)=100° C.
Flowability (210° C.)=121 cm
Pencil hardness=H
ΔE*=5.1
Moldability=○

EXAMPLE 9

100 parts by weight of the powdery polypropylene resin composition obtained in Example 8, 0.1 part by weight of an antioxidant based on phosphorus, 0.2 part by weight of an antioxidant based on phenol, 0.05 part by weight of calcium stearate as neutralizing agent and 0.2 part by weight of NA-11UY (trademark, a product of Asahi Denka Kogyo K.K.) as a nucleating agent were blended on a 20 liter Henschel mixer for 2 minutes, whereupon the mixture was extruded using a single screw extruder of 65 mm φ (of Ishinaka Tekkojo K.K.) at 220° C. to obtain a pelletized product. The pelletized product had an MFR of 26.0 g/10 min., an Mw/Mn value of 9.7 and an Mz/Mw value of 5.8. Evaluation tests for the injection-molded specimens produced from the resulting pelletized product were carried out as in Example 1. The results of tests were as given below:

MFR=26.0 g/10 min.
Mw/Mn=9.7
Mz/Mw=5.8
Specific gravity=0.911
Elongation at break=8%

Flexural modulus=2,938 MPa
Izod impact strength=14 J/m
Heat distorsion temperature (0.45 MPa)=150° C.
Heat distorsion temperature (1.81 MPa)=108° C.
Flowability (210° C.)=122 cm
Pencil hardness=F
ΔE*=3.7
Moldability=○

EXAMPLE 10

60% by weight of the powdery polypropylene resin composition obtained in Example 8 and 40% by weight of a conventionally employed powdery propylene homopolymer (having an MFR of 10.3 g/10 min., an intrinsic viscosity [η] of 1.85 dl/g, an Mw/Mn value of 5.0 and an isotactic pentad fraction of 95.6%) were blended. To 100 parts by weight of this blend, there were admixed 0.2 part by weight of an antioxidant based on phosphorus, 0.4 part by weight of an antioxidant based on phenol, 0.05 part by weight of calcium stearate as neutralizing agent and 2 parts by weight of talc LMS-300 (trademark, a product of Fuji Talc K.K. having an average particle size of 1.3 to 1.6 μm), on a 20 liter tumbler mixer over 10 minutes, whereupon the mixture was extruded by an anisotropic high speed twin-screw extruder of 65 mm φ (2UCM-Φ 65EXT (trademark) of Ube Industries, Ltd.) at 230° C. to obtain a pelletized product. The pelletized product had an MFR of 16.9 g/10 min., an Mw/Mn value of 10.7 and an Mz/Mw value of 6.1. The evaluation tests for the resulting injection molded article were carried out in the same manner as in Example 1. The test results were as given below:

Intrinsic viscosity [η] of the polypropylene resin composition=1.92 dl/g
(intrinsic viscosity [η] determined in tetralin at 135° C.=1.55 dl/g)
Intrinsic viscosity [η] of the higher molecular weight component=8.0 dl/g
(intrinsic viscosity [η] determined in tetralin at 135° C.=6.5 dl/g)
Content of the higher molecular weight component=9% by weight
Intrinsic viscosity [η] of the lower molecular weight component=1.32 dl/g
(intrinsic viscosity [η] determined in tetralin at 135° C.=1.06 dl/g)
Content of the lower molecular weight component=91% by weight
MFR=16.9 g/10 min.
Mw/Mn=10.7
Mz/Mw=6.1
Specific gravity=0.921
Elongation at break=16%
Flexural modulus=2,930 MPa
Izod impact strength=19 J/m
Heat distorsion temperature (0.45 MPa)=149° C.
Heat distorsion temperature (1.81 MPa)=97° C.
Flowability (210° C.)=104 cm
Pencil hardness=F
ΔE*=4.8
Moldability=○

EXAMPLE 11

A polypropylene resin composition was produced in a continuous two stage polymerization process using one polymerization reactor for the first stage polymerization and two polymerization reactors for the second stage polymerization. Thus, to a polymerization reactor 1 having an internal volume of 1,000 liters, there were supplied 157 liters per hour of heptane and, as the catalyst, 9.8 grams per hour of the pre-polymerized catalyst component 2 obtained in Production Example 2, 17.0 grams per hour of triethylaluminum and 33.9 grams per hour of DCPMS continuously, whereto propylene was supplied continuously while maintaining the internal pressure of the reactor-1 at 0.76 MPa (7.8 kgf/cm$^2$, gauge) at a temperature of 52° C. under a condition of substantial absence of hydrogen (the first stage polymerization). A sample of the slurry formed in the reactor 1 was collected to determine the intrinsic viscosity [η] of the resulting polypropylene, which gave a value of 8.5 dl/g.

The second stage polymerization was performed in a continuous process using two polymerization reactors. Thus, the slurry formed in the reactor 1 of the first stage polymerization was transferred continuously first to a polymerization reactor 2 having an internal volume of 500 liters to subject it to a further polymerization therein. To the reactor 2 were supplied continuously 14 liters per hour of heptane, while supplying thereto continuously propylene and hydrogen so as to maintain the reactor 2 at a temperature of 77° C., under an inner pressure of 0.95 MPa (9.8 kfg/cm$^2$, gauge) and at a hydrogen concentration in the gas phase of 48 vol.-%. Then, the resulting slurry in the reactor 2 was transferred continuously to a polymerization reactor 3 having an internal volume of 275 liters, in order to subject it to a further polymerization. To the reactor 3 were supplied continuously 16.8 liters per hour of heptane, while supplying thereto continuously propylene and hydrogen so as to maintain the reactor 3 at a temperature of 77° C., under an inner pressure of 0.80 MPa (8.2 kfg/cm$^2$, gauge) and at a hydrogen concentration in the gas phase of 42 vol.-%.

The slurry exhausted from the reactor 3 was subjected to a centrifugation in an ordinary manner after it was freed from the unreacted monomer, whereupon the so-separated solid matter was dried under a pressure of 9,300 Pa (70 mmHg, gauge) at 80° C. for 10 hours, whereby a powdery polypropylene resin composition was obtained. This powdery composition was produced at a throughput of 71 kg/hr.

The so-obtained polypropylene resin composition had an MFR of 23.4 g/10 min. The proportion of the polypropylene formed in the first stage polymerization relative to the finally obtained polypropylene resin composition was calculated from the material balance to be 22% by weight. The results of examination tests for this polypropylene resin composition were as given below:

Isotactic pentad fraction=97.9%
Intrinsic viscosity [ n ] of the polypropylene resin composition=2.49 dl/g
(intrinsic viscosity [η] determined in tetralin at 135° C.=2.10 dl/g)
Intrinsic viscosity [η] of the higher molecular weight component=8.5 dl/g
(intrinsic viscosity [η] determined in tetralin at 135° C.=7.2 dl/g)
Content of the higher molecular weight component=22% by weight
Intrinsic viscosity [η] of the lower molecular weight component=0.80 dl/g
(intrinsic viscosity [η] determined in tetralin at 135° C.=0.66 dl/g)
Content of the lower molecular weight component=78% by weight MFR=23.4 g/10 min.

Mw/Mn=20.7

Mz/Mw=6.5

100 parts by weight of the above-obtained powdery polypropylene resin composition, 0.1 part by weight of an antioxidant based on phosphorus, 0.2 part by weight of an antioxidant based on phenol, 0.05 part by weight of calcium stearate as neutralizing agent and 0.2 part by weight of NA-11UY (trademark, a product of Asahi Denka Kogyo K.K.) as a nucleating agent were blended on a 20 liter Henschel mixer for 2 minutes, whereupon the mixture was extruded using a single screw extruder of 65 mm φ (of Ishinaka Tekkojo K.K.) at 220° C. to obtain a pelletized product. The pelletized product had an MFR of 10.9 g/10 min., an Mw/Mn value of 20.7 and an Mz/Mw value of 6.5. The evaluation tests for the injection-molded article of the pelletized resin composition were carried out in the same manner as in Example 1. The test results were as given below:

MFR=10.9 g/10 min.

Mw/Mn=20.7

Mz/Mw=6.5

Specific gravity=0.911

Elongation at break=8%

Flexural modulus=2,730 MPa

Izod impact strength=17 J/m

Heat distorsion temperature (0.45 MPa)=149° C.

Heat distorsion temperature (1.81 MPa)=101° C.

Flowability (210° C.)=90 cm

Moldability=○

EXAMPLE 12

50% by weight of the powdery polypropylene resin composition obtained in Example 11 and 50% by weight of a conventionally employed powdery propylene homopolymer (having an MFR of 10.3 g/10 min., an intrinsic viscosity [η] of 1.85 dl/g, an Mw/Mn value of 5.0 and an isotactic pentad fraction of 95.6%) were blended. To 100 parts by weight of this blend, there were admixed 0.1 part by weight of an antioxidant based on phosphorus, 0.2 part by weight of an antioxidant based on phenol, 0.05 part by weight of calcium stearate as neutralizing agent and 0.2 part by weight of NA-11UY (trademark, a product of Asahi Denka Kogyo K.K.) as a nucleating agent on a 20 liter Henschel mixer over 2 minutes, whereupon the mixture was extruded using a single screw extruder of 65 mm φ of Ishinaka Tekkojo K.K.) at 220° C. to obtain a pelletized product. The pelletized product had an MFR of 8.6 g/10 min., an Mw/Mn value of 11.7 and an Mz/Mw value of 8.3. The evaluation tests for the injection-molded article of the pelletized resin composition were carried out in the same manner as in Example 1. The test results were as given below:

Intrinsic viscosity [η] of the polypropylene resin composition=2.17 dl/g (intrinsic viscosity [η] determined in tetralin at 135° C.=1.80 dl/g)

Intrinsic viscosity [η] of the higher molecular weight part=8.5 dl/g (intrinsic viscosity [η] determined in tetralin at 135° C.=7.2 dl/g)

Content of the higher molecular weight part=11% by weight

Intrinsic viscosity [η] of the lower molecular weight part=1.39 dl/g (intrinsic viscosity [η] determined in tetralin at 135° C.=1.13 dl/g)

Content of the lower molecular weight part=89% by weight

MFR=8.6 g/10 min.

Mw/Mn=11.7

Mz/Mw=8.3

Specific gravity=0.911

Elongation at break=13%

Flexural modulus=2,710 MPa

Izod impact strength=12 J/m

Heat distorsion temperature (0.45 MPa)=147° C.

Heat distorsion temperature (1.81 MPa)=102° C.

Flowability (210° C.)=86 cm

Pencil hardness=F

ΔE*=3.6

Moldability=○

Comparative Example 1

100 parts by weight of a conventionally employed powdery propylene homopolymer (having an isotactic pentad fraction of 97.2%, an MFR of 13.7 g/10 min., an intrinsic viscosity [η] of 1.78 dl/g, an Mw/Mn value of 4.8 and an Mz/Mw value of 2.8), 0.1 part by weight of an antioxidant based on phosphorus, 0.2 part by weight of an antioxidant based on phenol and 0.05 part by weight of calcium stearate as neutralizing agent were blended on a 20 liter Henschel mixer for 2 minutes, whereupon the mixture was extruded using a single screw extruder of 65 mm φ (of Ishinaka Tekkojo K.K.) at 220° C. to obtain a pelletized product. The pelletized product had an MFR of 14.0 g/10 min., an Mw/Mn value of 4.8 and an Mz/Mw value of 2.8. The evaluation tests for the injection-molded article of the pelletized resin composition were carried out in the same manner as in Example 1. The test results were as given below:

MFR=14.0 g/10 min.

Mw/Mn=4.8

Mz/Mw=2.8

Specific gravity=0.905

Elongation at break=414%

Flexural modulus=1,708 MPa

Izod impact strength=21 J/m

Heat distorsion temperature (0.45 MPa)=122° C.

Heat distorsion temperature (1.81 MPa)=80° C.

Flowability (210° C.)=90 cm

Pencil hardness=B

ΔE*=3.6

Moldability=○

Comparative Example 2

The procedures of Comparative Example 1 were pursued except that 0.2 part by weight of NA-11UY (trademark, a product of Asahi Denka Kogyo K.K.) was further added as a nucleating agent. The resulting pelletized product had an MFR of 14.1 g/10 min., an Mw/Mn value of 4.8 and an Mz/Mw value of 2.8. The evaluation tests for the injection-molded article of the pelletized resin composition were carried out in the same manner as in Example 1. The test results were as given below:

MFR=14.1 g/10 min.

Mw/Mn=4.8

Mz/Mw=2.8

Specific gravity=0.907

Elongation at break=13%

Flexural modulus=1,928 MPa

Izod impact strength=15 J/m

Heat distorsion temperature (0.45 MPa)=135° C.

Heat distorsion temperature (1.81 MPa)=87° C.

Flowability (210° C.)=90 cm

Pencil hardness=HB

ΔE*=3.3

Moldability=○

Comparative Example 3

100 parts by weight of a conventionally employed powdery propylene homopolymer (having an isotactic pentad fraction of 97.2%, an MFR of 13.7 g/10 min., an intrinsic viscosity [η] of 1.78 dl/g, an Mw/Mn value of 4.8 and an Mz/Mw value of 2.8), 0.1 part by weight of an antioxidant based on phosphorus, 0.2 part by weight of an antioxidant based on phenol, 0.05 part by weight of calcium stearate as neutralizing agent and 11 parts by weight of talc LMS-300 (trademark, a product of Fuji Talc K.K. having an average particle size of 1.3 to 1.6 μm) were blended on a 20 liter tumbler mixer for 10 minutes, whereupon the mixture was extruded by an anisotropic high speed twin-screw extruder of 65 mm φ (2UCM-Φ 65EXT (trademark) of Ube Industries, Ltd.) at 200° C. to obtain a pelletized product. The pelletized product had an MFR of 13.1 g/10 min., an Mw/Mn value of 4.7 and an Mz/Mw value of 2.8. The evaluation tests for the injection-molded article of the pelletized resin composition were carried out in the same manner as in Example 1. The test results were as given below:

MFR=13.1 g/10 min.

Mw/Mn=4.7

Mz/Mw=2.8

Specific gravity=0.971

Elongation at break=25%

Flexural modulus=2,586 MPa

Izod impact strength=31 J/m

Heat distorsion temperature (0.45 MPa)=142° C.

Heat distorsion temperature (1.81 MPa)=90° C.

Flowability (210° C.)=80 cm

Pencil hardness=HB

ΔE*=13.6

Moldability=○

Comparative Example 4

The procedures of Comparative Example 3 were pursued except that the amount of the talc added was changed to 18 parts by weight. The resulting pelletized product had an MFR of 12.7 g/10 min., an Mw/Mn value of 4.7 and an Mz/Mw value of 2.8. The evaluation tests for the injection-molded article of the pelletized resin composition were carried out in the same manner as in Example 1. The test results were as given below:

MFR=12.7 g/10 min.

Mw/Mn=4.7

Mz/Mw=2.8

Specific gravity=1.01

Elongation at break=15%

Flexural modulus=2,971 MPa

Izod impact strength=28 J/m

Heat distorsion temperature (0.45 MPa)=144° C.

Heat distorsion temperature (1.81 MPa)=95° C.

Flowability (210° C.)=75 cm

Pencil hardness=B

ΔE*=25.6

Moldability=○

Comparative Example 5

To a polymerization reactor having an internal volume of 3,480 liters, there were charged, under a nitrogen atmosphere, 1,180 liters of heptane, 137 grams of triethylaluminum in a diluted form, 273 grams of DCPMS and, as the catalyst, 72 grams of the catalyst component 1 obtained in Production Example 1. After removal of nitrogen gas in the polymerization reactor using a vacuum pump, the reactor was charged with propylene and, then, the temperature was started to be elevated. Propylene was supplied thereto continuously while maintaining the internal pressure of the reactor at 0.27 MPa (2.8 kfg/cm$^2$, gauge) at a temperature of 60° C. under a condition of substantial absence of hydrogen and the polymerization was continued for 2.2 hours (the first stage polymerization was over). After the first stage polymerization had terminated, a portion of the slurry formed in the reactor was sampled for determining the intrinsic viscosity [η] of the resulting polypropylene, which gave a value of 8.8 dl/g.

Then, the temperature was elevated to 70° C. and the polymerization was continued for 7.0 hours while supplying to the reactor continuously propylene and hydrogen so as to maintain the reactor internal pressure at 0.69 MPa (7.0 kfg/cm$^2$, gauge) and a hydrogen concentration in the gas phase at 55 vol.-% (the second stage polymerization was over). After the polymerization, 173 ml of methanol were charged to the reactor to terminate the polymerization. By purifying and drying in a conventional manner, 688 kg of a powdery polypropylene resin composition were obtained.

The resulting polypropylene resin composition had an MFR of 19.3 g/10 min. The proportion of the polypropylene formed in the first stage polymerization relative to the finally obtained polypropylene resin composition was calculated from the material balance to be 21.9% by weight. The results of examinations for this polypropylene resin composition were as given below:

Isotactic pentad fraction=98.4%

Intrinsic viscosity [η] of the polypropylene resin composition=2.29 dl/g (intrinsic viscosity [η] determined in tetralin at 135° C.=1.83 dl/g)

Intrinsic viscosity [η] of the higher molecular weight component=8.8 dl/g (intrinsic viscosity [η] determined in tetralin at 135° C.=6.7 dl/g)

Content of the higher molecular weight component= 21.9% by weight

Intrinsic viscosity [η] of the lower molecular weight component=0.45 dl/g (intrinsic viscosity [η] determined in tetralin at 135° C.=0.46 dl/g)

Content of the lower molecular weight component=78.1% by weight

MFR=19.3 g/10 min.

Mw/Mn=24.5

Mz/Mw=7.3

100 parts by weight of the above-obtained powdery polypropylene resin composition, 0.1 part by weight of an antioxidant based on phosphate, 0.2 part by weight of an antioxidant based on phenol, 0.05 part by weight of calcium stearate as neutralizing agent and 0.2 part by weight of NA-11UY (trademark, a product of Asahi Denka Kogyo K.K.) as a nucleating agent were blended on a 20 liter Henschel mixer for 2 minutes, whereupon the mixture was extruded using a single screw extruder of 65 mm φ (of Ishinaka Tekkojo K.K.) at 220° C. to obtain a pelletized product. The pelletized product had an MFR of 20.3 g/10 min., an Mw/Mn value of 24.5 and an Mz/Mw value of 7.3. The evaluation tests for the injection-molded article of the pelletized resin composition were carried out in the same manner as in Example 1. The test results were as given below:

MFR=20.3 g/10 min.
Mw/Mn=24.5
Mz/Mw=7.3
Specific gravity=0.911
Elongation at break=5%
Flexural modulus=2,912 MPa
Izod impact strength=8 J/m
Heat distorsion temperature (0.45 MPa)=149° C.
Heat distorsion temperature (1.81 MPa)=102° C.
Flowability (210° C.)=130 cm
Pencil hardness=H
ΔE*=3.6
Moldability=×

Comparative Example 6

To a polymerization reactor having an internal volume of 3,275 liters, there were charged, under a nitrogen atmosphere, 100 liters of heptane, 9.52 grams of triethylaluminum in a diluted form, 18.9 grams of DCPMS and, as the catalyst, 5 grams of the catalyst component 1 obtained in Production Example 1. After removal of nitrogen gas in the polymerization reactor using a vacuum pump, the reactor was charged with propylene and, then, the temperature was started to be elevated. Propylene was supplied thereto continuously while maintaining the internal pressure of the reactor at 0.29 MPa (3.0 kfg/cm$^2$, gauge) at a temperature of 60° C. under a condition of substantial absence of hydrogen and the polymerization was continued for 0.8 hour (the first stage polymerization was over). After the first stage polymerization had termianted, a portion of the slurry formed in the reactor was sampled for determining the intrinsic viscosity [η] of the resulting polypropylene, which gave a value of 8.7 dl/g.

Then, the temperature was elevated to 70° C. and the polymerization was continued for 4.2 hours while supplying to the reactor continuously propylene and hydrogen so as to maintain the reactor internal pressure at 0.30 MPa (3.1 kfg/cm$^2$, gauge) and a hydrogen concentration in the gas phase at 93 vol.-% (the second stage polymerization was over). After the polymerization, 10.0 ml of methanol were charged to the reactor to terminate the polymerization. By purifying and drying in a conventional manner, 48.5 kg of a powdery polypropylene resin composition were obtained.

The resulting polypropylene resin composition had an MFR of 5.8 g/10 min. The proportion of the polypropylene formed in the first stage polymerization relative to the finally obtained polypropylene resin composition was calculated from the material balance to be 9.1% by weight. The results of examinations for this polypropylene resin composition were as given below:

Isotactic pentad fraction=97.6%
Intrinsic viscosity [η] of the polypropylene resin composition=2.34 dl/g
(intrinsic viscosity [η] determined in tetralin at 135° C.=1.75 dl/g)
Intrinsic viscosity [η] of the higher molecular weight component=8.7 dl/g
(intrinsic viscosity [η] determined in tetralin at 135° C.=6.9 dl/g)
Content of the higher molecular weight component=9.1% by weight
Intrinsic viscosity [η] of the lower molecular weight component=1.71 dl/g
(intrinsic viscosity [η] determined in tetralin at 135° C.=1.24 dl/g)
Content of the lower molecular weight component=90.9% by weight
MFR=5.8 g/10 min.
Mw/Mn=7.2
Mz/Mw=4.9

100 parts by weight of the above-obtained powdery polypropylene resin composition, 0.1 part by weight of an antioxidant based on phosphorus, 0.2 part by weight of an antioxidant based on phenol, 0.05 part by weight of calcium stearate as neutralizing agent and 0.2 part by weight of NA-11UY (trademark, a product of Asahi Denka Kogyo K.K.) as a nucleating agent were blended on a 20 liter Henschel mixer for 2 minutes, whereupon the mixture was extruded using a single screw extruder of 65 mm φ (of Ishinaka Tekkojo K.K.) at 220° C. to obtain a pelletized product. The pelletized product had an MFR of 5.8 g/10 min., an Mw/Mn value of 7.2 and an Mz/Mw value of 4.9. The evaluation tests for the injection-molded article of the pelletized resin composition were carried out in the same manner as in Example 1. The test results were as given below:

MFR=5.8 g/10 min.
Mw/Mn=7.2
Mz/Mw=4.9
Specific gravity=0.911
Elongation at break=12%
Flexural modulus=2,414 MPa
Izod impact strength=20 J/m
Heat distorsion temperature (0.45 MPa)=147° C.
Heat distorsion temperature (1.81 MPa)=92° C.
Flowability (210° C.)=77 cm
Moldability=○

Comparative Example 7

100 parts by weight of the powdery polypropylene resin composition obtained in Comparative Example 6, 0.1 part by weight of an antioxidant based on phosphorus, 0.2 part by weight of an antioxidant based on phenol, 0.05 part by weight of calcium stearate as neutralizing agent and 2 parts by weight of talc LMS-300 (trademark, a product of Fuji Talc K.K. having an average particle size of 1.3 to 1.6 μm) were blended on a 20 liter tumbler mixer for 10 minutes, whereupon the mixture was extruded by an anisotropic high speed twin-screw extruder of 65 mm φ (2UCM-Φ 65EXT (trademark) of Ube Industries, Ltd.) at 200° C. to obtain a pelletized product. The pelletized product had an MFR of 6.2 g/10 min., an Mw/Mn value of 7.2 and an Mz/Mw value of 4.9. The evaluation tests for the injection-molded article of the pelletized resin composition were carried out in the same manner as in Example 1. The test results were as given below:

MFR=6.2 g/10 min.
Mw/Mn=7.2
Mz/Mw=4.9
Specific gravity=0.921
Elongation at break=22%
Flexural modulus=2,490 MPa
Izod impact strength=22 J/m
Heat distorsion temperature (0.45 MPa)=145° C.
Heat distorsion temperature (1.81 MPa)=88° C.
Flowability (210° C.)=76 cm
Pencil hardness=F
ΔE*=5.8
Moldability=○

EXAMPLE 13

50% by weight of the powdery polypropylene resin composition obtained in Comparative Example 5 and 50% by weight of a conventionally employed powdery propylene homopolymer (having an MFR of 10.3 g/10 min., an intrinsic viscosity [η] of 1.85 dl/g, an Mw/Mn value of 5.0 and an isotactic pentad fraction of 95.6%) were blended. To 100 parts by weight of this blend, there were admixed 0.1 part by weight of an antioxidant based on phosphorus, 0.2 part by weight of an antioxidant based on phenol, 0.05 part by weight of calcium stearate as neutralizing agent and 0.2 part by weight of NA-11UY (trademark, a product of Asahi Denka Kogyo K.K.) as a nucleating agent on a 20 liter Henschel mixer over 2 minutes, whereupon the mixture was extruded using a single screw extruder of 65 mm φ (of Ishinaka Tekkojo K.K.) at 220° C. to obtain a pelletized product. The evaluation tests for the injection-molded article of the pelletized resin composition were carried out in the same manner as in Example 1. The test results were as given below:

Isotactic pentad fraction=97.5%
Intrinsic viscosity [η] of the polypropylene resin composition=2.07 dl/g
(intrinsic viscosity [η] determined in tetralin at 135° C.=1.67 dl/g)
Intrinsic viscosity [η] of the higher molecular weight component=8.8 dl/g
(intrinsic viscosity [η] determined in tetralin at 135° C.=6.7 dl/g)
Content of the higher molecular weight component=11% by weight
Intrinsic viscosity [η] of the lower molecular weight component=1.24 dl/g
(intrinsic viscosity [η] determined in tetralin at 135° C.=1.04 dl/g)
Content of the lower molecular weight component=89% by weight
MFR=10.0 g/10 min.
Mw/Mn=12.0
Mz/Mw=5.7
Specific gravity=0.910
Elongation at break=11%
Flexural modulus=2,718 MPa
Izod impact strength=15 J/m
Heat distorsion temperature (0.45 MPa)=147° C.
Heat distorsion temperature (1.81 MPa)=98° C.
Flowability (210° C.)=95 cm
Pencil hardness=F
ΔE*=3.7
Moldability=○

What is claimed is:

1. A polypropylene resin composition comprising 5–25% by weight of a higher molecular weight polypropylene (A) having an intrinsic viscosity [η], determined in decalin at 135° C., in the range from 6 to 11 dl/g and 95–75% by weight of a lower molecular weight polypropylene (B) having an intrinsic viscosity [η], determined in decalin at 135° C., in the range from 0.6 to 1.6 dl/g, wherein the said resin composition has the following characteristic features <<1>> and <<2>>, namely, <<1>> an isotactic pentad fraction (mmmm-fraction), determined by $^{13}$C-NMR, of at least 96.5% and <<2>> a molecular weight distribution expressed by Mw/Mn (weight-average molecular weight/number-average molecular weight), determined by gel permeation chromatography (GPC), of at least 8.

2. A polypropylene resin composition as claimed in claim 1, wherein the resin composition has the following characteristic features <<3>> to <<6>>, namely, <<3>> a flexural modulus (ASTM D 790) of at least 2,700 MPa, <<4>> an elongation at break (ASTM D 638) of at least 7%, <<5>> a heat distortion temperature (ASTM D 648, under a load of 0.45 MPa) of at least 145° C., and <<6>> a flowability of at least 85 cm, determined using a flow length testing mold having a spiral flow path of a depth of 3 mm, a width of 10 mm and a length of 2,000 mm by performing an injection molding at a resin temperature of 210° C. and at a mold temperature of 40° C. to observe the flow length (the length of spiral flow).

3. A polypropylene resin composition as claimed in claim 1, wherein the resin composition is obtained by a continuous multistage polymerization.

4. A polypropylene resin composition as claimed in claim 1, wherein it contains an inorganic filler (C).

5. A polypropylene resin composition as claimed in claim 4, wherein it has the following characteristic feature <<7>>, namely, <<7>> a specific gravity, determined by the water-displacement method (ASTM D 1505), of not higher than 0.930.

6. A polypropylene resin composition as claimed in claim 4, wherein it has the following characteristic features <<8>> and <<9>>, namely, <<8>> a pencil hardness {JIS K-5400, under a load of 9.8 N (1 kgf)} of F or harder and <<9>> a color difference value ΔE* after scratch test of 8.0 or lower.

7. A polypropylene resin composition as claimed in of claim 1, wherein it contains a nucleating agent (D).

8. A polypropylene resin composition as claimed in claim 1, wherein it is devoid of any cross-linked structure.

9. An injection molded article obtained by injection-molding a polypropylene resin composition as claimed in claim 1.

10. A polypropylene resin composition as claimed in claim 2, wherein the resin composition is obtained by a continuous multistage polymerization.

11. A polypropylene resin composition as claimed in claim 2, further comprising an inorganic filler (C).

12. A polypropylene resin composition as claimed in claim 3, further comprising an inorganic filler (C).

13. A polypropylene resin composition as claimed in claim 10, further comprising an inorganic filler (C).

14. A polypropylene resin composition according to claim 11, further characterized by
<<7>> a specific gravity, determined by the water displacement method (ASTM D 1505), of not higher than 0.930.

15. A polypropylene resin composition according to claim 12, further characterized by
<<7>> a specific gravity, determined by the water displacement method (ASTM D 1505), of not higher than 0.930.

16. A polypropylene resin composition according to claim 13, further characterized by
<<7>> a specific gravity, determined by the water displacement method (ASTM D 1505), of not higher than 0.930.

17. A polypropylene resin composition according to claim 11, further characterized by
<<8>> a pencil hardness {JIS K-5400, under a load of 9.8 N (1 kgf)} of F or harder; and
<<9>> a color difference value $\Delta E^*$ after scratch test of 8.0 or lower.

18. A polypropylene resin composition according to claim 12, further characterized by
<<8>> a pencil hardness {JIS K-5400, under a load of 9.8 N (1 kgf)} of F or harder; and
<<9>> a color difference value $\Delta E^*$ after scratch test of 8.0 or lower.

19. A polypropylene resin composition according to claim 13, further characterized by
<<8>> a pencil hardness {JIS K-5400, under a load of 9.8 N (1kgf)} of F or harder; and
<<9>> a color difference value $\Delta E^*$ after scratch test of 8.0 or lower.

20. A polypropylene resin composition according to claim 5, further characterized by
<<8>> a pencil hardness {JIS K-5400, under a load of 9.8 N (1 kgf)} of F or harder; and
<<9>> a color difference value $\Delta E^*$ after scratch test of 8.0 or lower.

21. A polypropylene resin composition according to claim 14, further characterized by
<<8>> a pencil hardness {JIS K-5400, under a load of 9.8 N (1 kgf)} of F or harder; and
<<9>> a color difference value $\Delta E^*$ after scratch test of 8.0 or lower.

22. A polypropylene resin composition according to claim 15, further characterized by
<<8>> a pencil hardness {JIS K-5400, under a load of 9.8 N (1 kgf)} of F or harder; and
<<9>> a color difference value $\Delta E^*$ after scratch test of 8.0 or lower.

23. A polypropylene resin composition according to claim 16, further characterized by
<<8>> a pencil hardness {JIS K-5400, under a load of 9.8 N (1 kgf)} of F or harder; and
<<9>> a color difference value $\Delta E^*$ after scratch test of 8.0 or lower.

24. The polypropylene composition of claim 2, further comprising a nucleating agent (D).

25. The polypropylene composition of claim 3, further comprising a nucleating agent (D).

26. The polypropylene composition of claim 4, further comprising a nucleating agent (D).

27. The polypropylene composition of claim 5, further comprising a nucleating agent (D).

28. The polypropylene composition of claim 6, further comprising a nucleating agent (D).

29. The polypropylene composition of claim 2, further characterized by absence of cross-linked structure.

30. The polypropylene composition of claim 3, further characterized by absence of cross-linked structure.

31. The polypropylene composition of claim 4, further characterized by absence of cross-linked structure.

32. The polypropylene composition of claim 5, further characterized by absence of cross-linked structure.

33. The polypropylene composition of claim 6, further characterized by absence of cross-linked structure.

34. The polypropylene composition of claim 7, further characterized by absence of cross-linked structure.

35. The polypropylene composition of claim 2, further characterized by absence of cross-linked structure.

36. An injection-molded article obtained by injection-molding the polypropylene resin composition according to claim 2.

37. An injection-molded article obtained by injection-molding the polypropylene resin composition according to claim 3.

38. An injection-molded article obtained by injection-molding the polypropylene resin composition according to claim 4.

39. An injection-molded article obtained by injection-molding the polypropylene resin composition according to claim 5.

40. An injection-molded article obtained by injection-molding the polypropylene resin composition according to claim 6.

41. An injection-molded article obtained by injection-molding the polypropylene resin composition according to claim 7.

42. An injection-molded article obtained by injection-molding the polypropylene resin composition according to claim 8.

* * * * *